United States Patent
Mendell

(10) Patent No.: US 11,895,373 B2
(45) Date of Patent: Feb. 6, 2024

(54) SYSTEMS AND METHODS FOR GENERATING NOTIFICATION INTERFACES BASED ON MEDIA BROADCAST ACCESS EVENTS

(71) Applicant: DK Crown Holdings Inc., Boston, MA (US)

(72) Inventor: Jordan Mendell, Boca Raton, FL (US)

(73) Assignee: DK Crown Holdings Inc., Boston, MA (US)

(*) Notice: Subject to any disclaimer, the term of this patent is extended or adjusted under 35 U.S.C. 154(b) by 0 days.

(21) Appl. No.: 17/516,150

(22) Filed: Nov. 1, 2021

(65) Prior Publication Data

US 2023/0134297 A1 May 4, 2023

Related U.S. Application Data

(60) Provisional application No. 63/273,580, filed on Oct. 29, 2021.

(51) Int. Cl.
*H04N 21/488* (2011.01)
*G07F 17/32* (2006.01)
(Continued)

(52) U.S. Cl.
CPC ..... *H04N 21/4882* (2013.01); *G07F 17/3211* (2013.01); *G07F 17/3237* (2013.01);
(Continued)

(58) Field of Classification Search
CPC .......... H04N 21/8126; H04N 21/2187; H04N 21/25808; H04N 21/4882; H04N 21/6543
See application file for complete search history.

(56) References Cited

U.S. PATENT DOCUMENTS 5,830,068 A 11/1998 Brenner et al.
6,735,487 B1 * 5/2004 Marshall ............. G07F 17/3255
725/135
(Continued)

FOREIGN PATENT DOCUMENTS

EP 1 484 723 A2 12/2004
EP 4024322 A1 7/2022

OTHER PUBLICATIONS

Non-Final Office Action on U.S. Appl. No. 17/516,197 dated Jan. 13, 2022.
(Continued)

*Primary Examiner* — Michael R Telan
(74) *Attorney, Agent, or Firm* — Foley & Lardner LLP

(57) ABSTRACT

Systems and methods for generating notification interfaces based on media broadcast access events are provided. The system can determine, based on one or more attributes of the plurality of historic content streams accessed by a broadcast receiver device, an arrangement of the plurality of content items corresponding to the one or more live events. The system can generate display instructions for the broadcast receiver device that cause the broadcast receiver device to display a notification including the plurality of content items with a broadcast of a live event of the one or more live events according to the arrangement. The system can transmit the display instructions to the broadcast receiver device to cause the broadcast receiver device to display the notification including the plurality of content items with the broadcast of the live event of the one or more live events according to the arrangement.

18 Claims, 13 Drawing Sheets

(51) Int. Cl.

| | | |
|---|---|---|
| *H04N 21/431* | (2011.01) | |
| *H04N 21/258* | (2011.01) | |
| *H04N 21/2187* | (2011.01) | |
| *H04N 21/478* | (2011.01) | |
| *H04N 21/45* | (2011.01) | |
| *H04N 21/6547* | (2011.01) | |
| *H04N 21/81* | (2011.01) | |
| *H04N 21/458* | (2011.01) | |
| *H04N 21/475* | (2011.01) | |
| *H04N 21/262* | (2011.01) | |
| *H04N 21/6543* | (2011.01) | |
| *H04N 21/235* | (2011.01) | |
| *H04N 21/414* | (2011.01) | |

(52) U.S. Cl.
CPC ..... *G07F 17/3288* (2013.01); *H04N 21/2187* (2013.01); *H04N 21/2353* (2013.01); *H04N 21/25808* (2013.01); *H04N 21/2625* (2013.01); *H04N 21/26208* (2013.01); *H04N 21/41407* (2013.01); *H04N 21/4316* (2013.01); *H04N 21/458* (2013.01); *H04N 21/4518* (2020.08); *H04N 21/4524* (2013.01); *H04N 21/4532* (2013.01); *H04N 21/478* (2013.01); *H04N 21/4753* (2013.01); *H04N 21/6543* (2013.01); *H04N 21/6547* (2013.01); *H04N 21/8126* (2013.01); *H04N 21/8133* (2013.01)

(56) References Cited

U.S. PATENT DOCUMENTS

| | | | |
|---|---|---|---|
| 7,904,924 B1 | 3/2011 | Heer et al. | |
| 8,538,563 B1 | 9/2013 | Barber | |
| 10,664,138 B2* | 5/2020 | Carney | H04N 21/4316 |
| 11,190,736 B2 | 11/2021 | Kawakami et al. | |
| 11,217,067 B1 | 1/2022 | Huke et al. | |
| 2005/0005291 A1 | 1/2005 | McGinley | |
| 2008/0066111 A1 | 3/2008 | Ellis et al. | |
| 2008/0112690 A1 | 5/2008 | Shahraray et al. | |
| 2008/0148317 A1* | 6/2008 | Opaluch | H04N 21/4663 725/46 |
| 2009/0082095 A1 | 3/2009 | Walker et al. | |
| 2009/0158374 A1 | 6/2009 | Malaure et al. | |
| 2009/0183178 A1 | 7/2009 | Imai et al. | |
| 2009/0288118 A1* | 11/2009 | Chang | H04N 21/42203 725/46 |
| 2010/0041482 A1 | 2/2010 | Kumar et al. | |
| 2010/0262986 A1* | 10/2010 | Adimatyam | H04N 21/47 725/9 |
| 2011/0069940 A1 | 3/2011 | Shimy et al. | |
| 2011/0086699 A1 | 4/2011 | Allen et al. | |
| 2012/0033943 A1 | 2/2012 | Klappert et al. | |
| 2013/0002716 A1 | 1/2013 | Walker et al. | |
| 2013/0027613 A1 | 1/2013 | Kim et al. | |
| 2013/0225298 A1 | 8/2013 | Hamlin et al. | |
| 2013/0282421 A1 | 10/2013 | Graff et al. | |
| 2014/0062696 A1 | 3/2014 | Packard et al. | |
| 2014/0068692 A1 | 3/2014 | Archibong et al. | |
| 2014/0129570 A1* | 5/2014 | Johnson | H04N 21/4788 707/748 |
| 2014/0130079 A1* | 5/2014 | Arora | H04N 21/2187 725/24 |
| 2014/0201769 A1 | 7/2014 | Neumeier et al. | |
| 2014/0282721 A1 | 9/2014 | Kuncl et al. | |
| 2015/0163547 A1 | 6/2015 | Whitten | |
| 2015/0172338 A1 | 6/2015 | Moran et al. | |
| 2016/0088352 A1 | 3/2016 | Agarwal et al. | |
| 2016/0227281 A1 | 8/2016 | Abuelsaad et al. | |
| 2017/0034594 A1 | 2/2017 | Francis et al. | |
| 2017/0070769 A1* | 3/2017 | Bostick | H04N 21/4668 |
| 2018/0048936 A1 | 2/2018 | Gupta et al. | |
| 2018/0060439 A1 | 3/2018 | Kula et al. | |
| 2018/0108380 A1 | 4/2018 | Packard et al. | |
| 2019/0205839 A1 | 7/2019 | Dotan-Cohen et al. | |
| 2019/0268663 A1 | 8/2019 | Fischer | |
| 2019/0349638 A1 | 11/2019 | Baek et al. | |
| 2019/0362601 A1 | 11/2019 | Kline et al. | |
| 2019/0384469 A1 | 12/2019 | Lo et al. | |
| 2020/0213678 A1 | 7/2020 | Pleiman | |
| 2020/0245017 A1* | 7/2020 | Ganschow | H04N 21/4312 |
| 2020/0252664 A1 | 8/2020 | Weinraub | |
| 2020/0357246 A1* | 11/2020 | Nelson | G07F 17/323 |
| 2021/0076099 A1* | 3/2021 | Ganschow | H04N 21/222 |
| 2021/0217269 A1* | 7/2021 | Huke | G07F 17/323 |
| 2022/0103905 A1 | 3/2022 | Montgomery et al. | |
| 2022/0157127 A1 | 5/2022 | Tadepalli et al. | |
| 2022/0309873 A1 | 9/2022 | Russ et al. | |
| 2022/0321951 A1 | 10/2022 | Chandrashekar et al. | |
| 2022/0377427 A1 | 11/2022 | Montgomery et al. | |

OTHER PUBLICATIONS

Non-Final Office Action on U.S. Appl. No. 17/516,200 dated Dec. 21, 2021.
Non-Final Office Action on U.S. Appl. No. 17/516,134 dated Feb. 1, 2022.
Notice of Allowance on U.S. Appl. No. 17/516,200 dated Apr. 27, 2022.
Notice of Allowance on U.S. Appl. No. 17/516,134 dated Jun. 6, 2022.
Notice of Allowance on U.S. Appl. No. 17/516,197 dated May 6, 2022.
Non-Final Office Action on U.S. Appl. No. 17/976,120 dated Jan. 25, 2023.
Non-Final Office Action on U.S. Appl. No. 17/976,130 dated Feb. 2, 2023.
Non-Final Office Action on U.S. Appl. No. 17/976,097 dated Mar. 2, 2023.
Non-Final Office Action on U.S. Appl. No. 17/976,107 dated Mar. 28, 2023.
Non-Final Office Action on U.S. Appl. No. 17/976,141 dated Mar. 16, 2023.
Notice of Allowance on U.S. Appl. No. 17/976,120 dated May 9, 2023.
Final Office Action on U.S. Appl. No. 17/976,097 dated Jul. 10, 2023.
Final Office Action on U.S. Appl. No. 17/976,107 dated Aug. 11, 2023.
Final Office Action on U.S. Appl. No. 17/976,130 dated Jun. 1, 2023.
Final Office Action on U.S. Appl. No. 17/976,141 dated Jul. 13, 2023.
Non-Final Office Action on U.S. Appl. No. 17/976,130 dated Sep. 14, 2023.
Non-Final Office Action on U.S. Appl. No. 17/947,444 dated Oct. 11, 2023.
Non-Final Office Action on U.S. Appl. No. 17/976,141 dated Nov. 29, 2023.
Notice of Allowance on U.S. Appl. No. 17/943,930 dated Oct. 17, 2023.
Notice of Allowance on U.S. Appl. No. 17/976,097 dated Nov. 7, 2023.

* cited by examiner

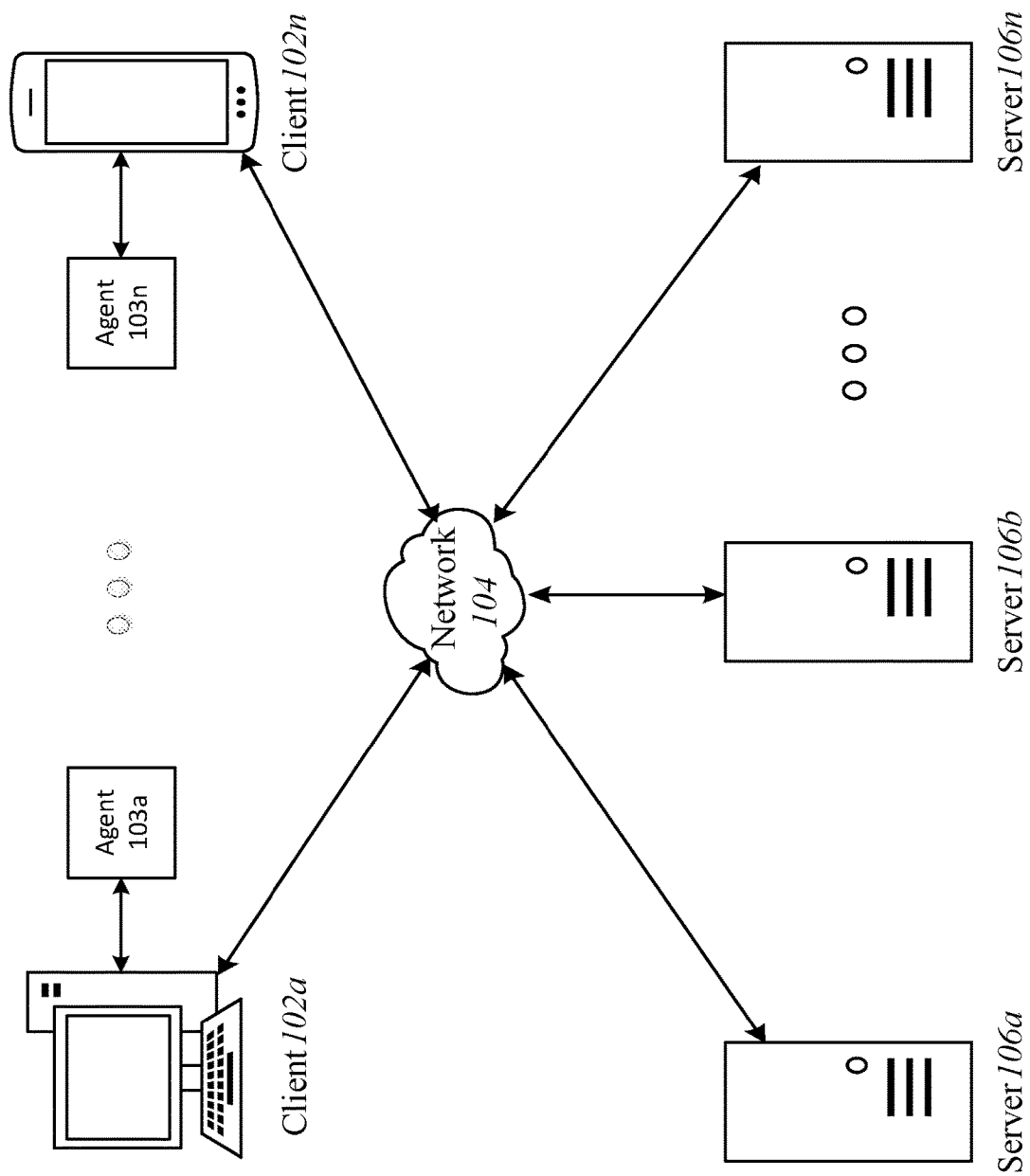

SYSTEMS AND METHODS FOR GENERATING NOTIFICATION INTERFACES BASED ON MEDIA BROADCAST ACCESS EVENTS

CROSS-REFERENCE TO RELATED APPLICATIONS

The present application claims the benefit of and priority to U.S. Provisional Patent Application No. 63/273,580, filed Oct. 29, 2021, and titled "SYSTEMS AND METHODS FOR IMPROVED MANAGEMENT OF PROCESSING BROADCAST DATA," the contents of which is incorporated herein by reference in its entirety for all purposes.

BACKGROUND

Broadcast devices, such as cable boxes or set-top boxes, are used to display broadcast content received from a broadcast source. Due to the one-to-many nature of broadcast content, it is challenging to monitor and display information relating to a specific broadcast device with broadcast content.

SUMMARY

It is therefore advantageous for a system to provide techniques to identify characteristics of a broadcast receiver device, and to display notifications, alerts, or user interfaces in a content stream with broadcast content. Conventional broadcast systems are incapable of providing customized or broadcast receiver device-specific information to broadcast receiver devices displaying content broadcasts, due to the one-to-many configuration of traditional broadcast systems. The systems and methods described herein overcome these limitations by generating instructions for a broadcast provider system, which is in communication with many broadcast receiver devices, or by communicating directly with broadcast receiver devices, to display content items in connection with live content. The systems and methods described herein provide a significant technical improvement over traditional broadcast content systems, because the techniques described herein allow for both identifying content streams being displayed at particular broadcast receiver devices, and generating display instructions to display relevant content items without interrupting or detracting from the quality of the broadcast content. In addition, the systems and methods described herein can generate instructions to provide or otherwise update information based on real-time events that occur in the content streams.

At least one aspect of the present disclosure is generally directed to a method for generating notification interfaces based on media broadcast access events. The method can be performed, for example, by one or more processors coupled to a memory. The method can include maintaining a plurality of content items corresponding to one or more live events. The method can include identifying a plurality of historic content streams accessed by a broadcast receiver device. The method can include determining based on one or more attributes of the plurality of historic content streams, an arrangement of the plurality of content items corresponding to the one or more live events. The method can include generating display instructions for the broadcast receiver device that cause the broadcast receiver device to display a notification including the plurality of content items with a broadcast of a live event of the one or more live events according to the arrangement. The method can include transmitting the display instructions to the broadcast receiver device to cause the broadcast receiver device to display the notification including the plurality of content items with the broadcast of the live event of the one or more live events according to the arrangement.

In some implementations, the method can include identifying the broadcast receiver device based on the broadcast receiver device displaying the broadcast of the live event.

In some implementations, the method can include selecting the plurality of content items based on the live event.

In some implementations, generating the display instructions further comprises generating the display instructions such that each content item of the plurality of content items includes a respective actionable object that, when actuated, causes the broadcast receiver device to transmit a request corresponding to the content item.

In some implementations, generating the display instructions further comprises generating the display instructions such that each content item of the plurality of content items includes a respective actionable object that, when actuated, causes the broadcast receiver device to display a second broadcast of a second live event associated with the content item.

In some implementations, determining the arrangement of the plurality of content items further comprises determining an order in which to display the plurality of content items as a list.

In some implementations, identifying the plurality of historic content streams accessed by the broadcast receiver device further comprises identifying the plurality of historic content streams from a player profile associated with the broadcast receiver device.

In some implementations, determining the arrangement of the plurality of content items is further based on one or more attributes of a current broadcast being displayed by the broadcast receiver device.

In some implementations, the method can include receiving a request to authorize access to the plurality of historic content streams accessed by the broadcast receiver device. In some implementations, the method can include identifying the plurality of historic content streams accessed by the broadcast receiver device responsive to the request.

In some implementations, identifying the plurality of historic content streams further comprises accessing the plurality of historic content streams at a broadcast provider system in communication with the broadcast receiver device.

At least one other aspect of the present disclosure is generally directed to a system for generating notification interfaces based on media broadcast access events. The system can include one or more processors coupled to a memory. The system can maintain a plurality of content items corresponding to one or more live events. The system can identify a plurality of historic content streams accessed by a broadcast receiver device. The system can determine, based on one or more attributes of the plurality of historic content streams, an arrangement of the plurality of content items corresponding to the one or more live events. The system can generate display instructions for the broadcast receiver device that cause the broadcast receiver device to display a notification including the plurality of content items with a broadcast of a live event of the one or more live events according to the arrangement. The system can transmit the display instructions to the broadcast receiver device to cause the broadcast receiver device to display the notification including the plurality of content items with the broadcast of the live event of the one or more live events according to the arrangement.

In some implementations, the one or more processors are further configured to identify the broadcast receiver device based on the broadcast receiver device displaying the broadcast of the live event.

In some implementations, the one or more processors are further configured to select the plurality of content items based on the live event.

In some implementations, to generate the display instructions, the one or more processors are further configured to generate the display instructions such that each content item of the plurality of content items includes a respective actionable object that, when actuated, causes the broadcast receiver device to transmit a request corresponding to the content item.

In some implementations, to generate the display instructions, the one or more processors are further configured to generate the display instructions such that each content item of the plurality of content items includes a respective actionable object that, when actuated, causes the broadcast receiver device to display a second broadcast of a second live event associated with the content item.

In some implementations, to determine the arrangement of the plurality of content items, the one or more processors are further configured to determine an order in which to display the plurality of content items as a list.

In some implementations, to identify the plurality of historic content streams accessed by the broadcast receiver device, the one or more processors are further configured to identify the plurality of historic content streams from a player profile associated with the broadcast receiver device.

In some implementations, the one or more processors are further configured to determine the arrangement of the plurality of content items further based on one or more attributes of a current broadcast being displayed by the broadcast receiver device.

In some implementations, the one or more processors are further configured to receive a request to authorize access to the plurality of historic content streams accessed by the broadcast receiver device. In some implementations, the one or more processors are further configured to identify the plurality of historic content streams accessed by the broadcast receiver device responsive to the request.

In some implementations, to identify the plurality of historic content streams, the one or more processors are further configured to access the plurality of historic content streams at a broadcast provider system in communication with the broadcast receiver device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g., disks) or intangible carrier media (e.g., communications signals). Aspects may also be implemented using suitable apparatus, which may take the form of programmable computers running computer programs arranged to implement the aspect. As used in the specification and in the claims, the singular form of "a", "an", and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an implementation of a network environment comprising a client device in communication with a server device;

DETAILED DESCRIPTION

Figure 1B:
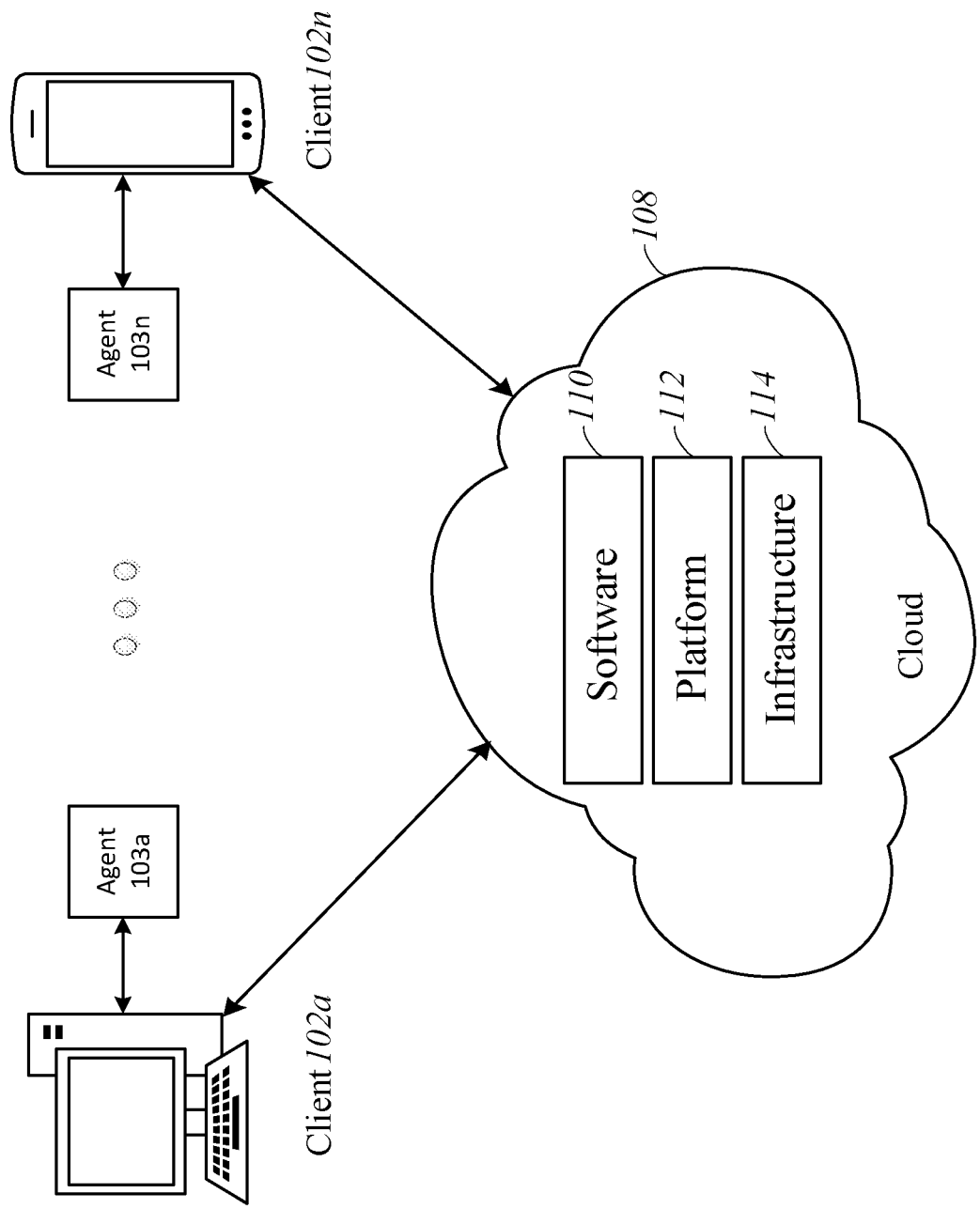
FIG. 1B is a block diagram depicting a cloud computing environment comprising a client device in communication with cloud service providers.

Below are detailed descriptions of various concepts related to, and implementations of, techniques, approaches, methods, apparatuses, and systems for generating notification interfaces based on interactions with broadcast events. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing implementations described herein; and Section B describes systems and methods for generating notification interfaces based on media broadcast access events.

A. Computing and Network Environment

Prior to discussing specific implements of the various aspects of this technical solution, it may be helpful to describe aspects of the operating environment as well as associated system components (e.g., hardware elements) in connection with the methods and systems described herein.

Referring to FIG. 1A, an implementation of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some implementations, a client 102 has the capacity to function as both a client node 102 seeking access to resources provided by a server 106 and as a server 106 providing access to hosted resources for other client devices 102a-102n.

Although FIG. 1A shows a network 104 between the clients 102 and the servers 106, the clients 102 and the servers 106 may be on the same network 104. In some implementations, there are multiple networks 104 between the clients 102 and the servers 106. In one of these implementations, a network 104 (not shown) may be a private network and a network 104 may be a public network. In another of these implementations, a network 104 may be a private network and a network 104 a public network. In still another of these implementations, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some implementations, different types of data may be transmitted via different links and standards. In other implementations, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some implementations, the system may include multiple, logically grouped servers 106. In one of these implementations, the logical group of servers 106 may be referred to as a server farm 38 (not shown) or a machine farm 38. In another of these implementations, the servers 106 may be geographically dispersed. In other implementations, a machine farm 38 may be administered as a single entity. In still other implementations, the machine farm 38 includes one or more machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one implementation, servers 106 in the machine farm may be stored in high-density rack systems, along with associated storage systems, and located in an enterprise data center. In this implementation, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these implementations, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems, and modules to support one or more management services for the machine farm 38. In one of these implementations, one or more servers 106 provide functionality for management of dynamic data, including techniques for handling failover, data replication, and increasing the robustness of the machine farm 38. Each server 106 may communicate with a persistent store and, in some implementations, with a dynamic store.

Server 106 may be a file server, application server, web server, proxy server, appliance, network appliance, gateway, gateway server, virtualization server, deployment server, SSL VPN server, or firewall. In one implementation, the server 106 may be referred to as a remote machine or a node. In another implementation, one or more nodes 106 may be in the path between any two communicating servers 106.

Referring to FIG. 1B, a cloud-computing environment is depicted. A cloud-computing environment may provide client 102 with one or more resources provided by a network environment. The cloud-computing environment may include one or more clients' 102a-102n, in communication with respective agents' 103a-103n and with the cloud 108 over one or more networks 104. Clients 102 may include, e.g., thick clients, thin clients, and zero clients. A thick client 102 may provide at least some functionality even when disconnected from the cloud 108 or servers 106. A thin client 102 or a zero client 102 may depend on the connection to the cloud 108 or server 106 to provide functionality. A zero client 102 may depend on the cloud 108 or other networks 104 or servers 106 to retrieve operating system data for the client device 102. The cloud 108 may include back end platforms, e.g., servers 106, storage, server farms, or data centers.

The cloud 108 may be public, private, or hybrid. Public clouds 108 may include public servers 106 that are maintained by third parties to the clients' 102 or the owners of the clients' 102. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients 102. Private clouds 108 may be connected to the servers 106 over a private network 104. Hybrid clouds 108 may include both the private and public networks 104 and servers 106.

The cloud 108 may also include a cloud-based delivery, e.g., Software as a Service (SaaS) 110, Platform as a Service (PaaS) 112, and Infrastructure as a Service (IaaS) 114. IaaS 114 may refer to a user renting the use of infrastructure resources that are needed during a specified time period. IaaS 114 providers may offer storage, networking, servers 106, or virtualization resources from large pools, allowing the users to scale up by accessing more resources as needed. Examples of IaaS 114 include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS 112 providers may offer functionality provided by IaaS 114, including, e.g., storage, networking, servers 106, or virtualization, as well as additional resources such as, e.g., the operating system, middleware, or runtime resources. Examples of PaaS 112 include WINDOWS AZURE provided by Microsoft Corporation of Redmond, Washington; Google App Engine provided by Google Inc.; and HEROKU provided by Heroku, Inc. of San Francisco, California. SaaS 110 providers may offer the resources that PaaS 112 provides, including storage, networking, servers 106, virtualization, operating system, middleware, or runtime resources. In some implementations, SaaS 110 providers may offer additional resources including, e.g., data and application resources. Examples of SaaS 110 include GOOGLE APPS provided by Google Inc.; SALESFORCE provided by Salesforce.com Inc. of San Francisco, California; or OFFICE 365 provided by Microsoft Corporation. Examples of SaaS 110 may also include data storage providers, e.g., DROPBOX provided by Dropbox, Inc. of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients 102 access to resources over HTTP, and may use Representational State Transfer (REST) protocol or Simple Object Access Protocol (SOAP). Clients 102 may access PaaS resources with different PaaS interfaces. Some PaaS interfaces use HTTP packages; standard Java APIs; JavaMail API; Java Data Objects (JDO); Java Persistence API (JPA); Python APIs; web integration APIs for different programming languages including, e.g., Rack for Ruby, WSGI for Python, or PSGI for Perl; or other APIs that may be built on REST, HTTP, XML, or other protocols. Clients 102 may access SaaS resources by using web-based user interfaces provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some implementations, access to IaaS, PaaS, or SaaS resources may be authenticated. For example, a server 106 or authentication server 106 may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
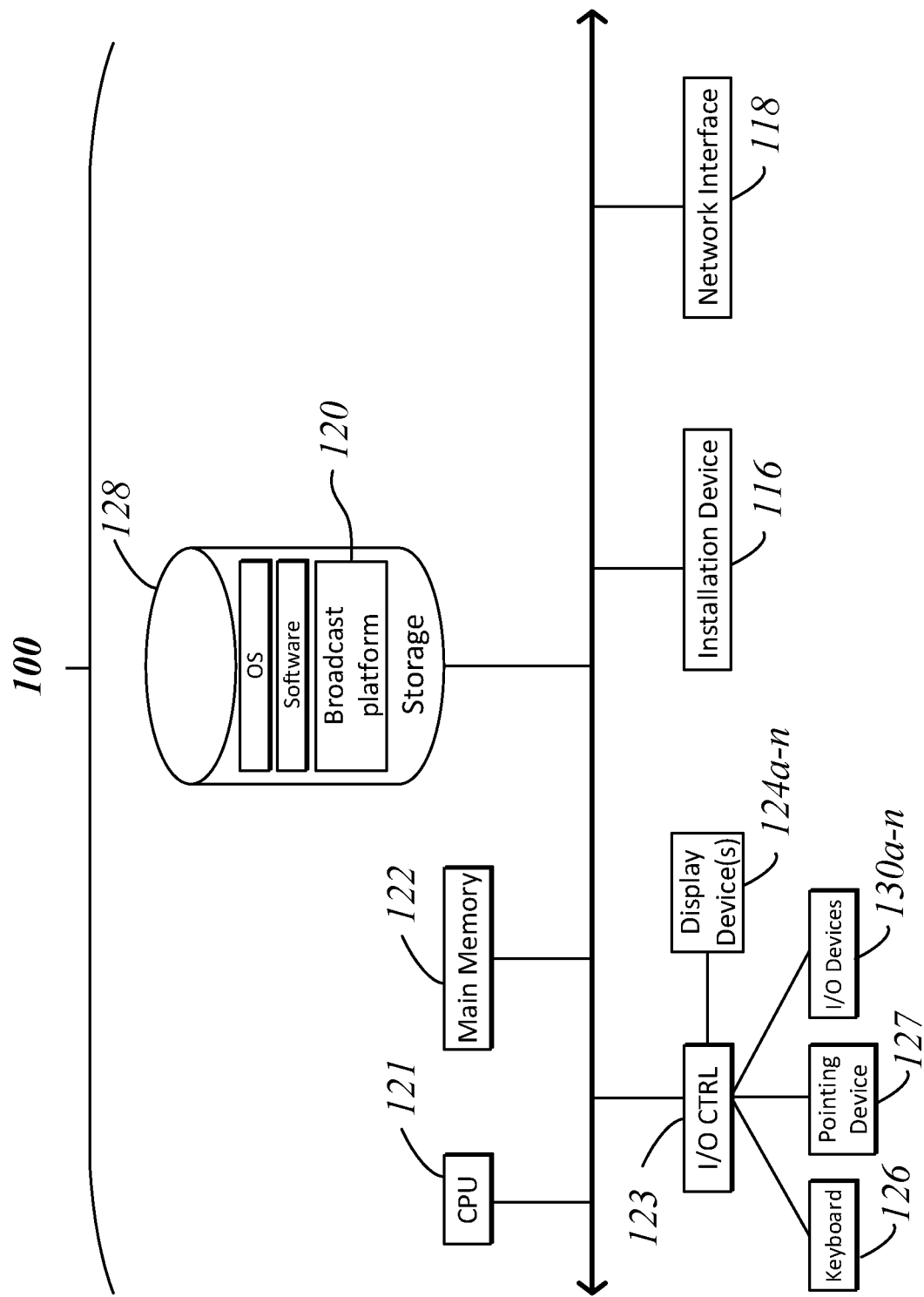
FIGS. 1C and 1D are block diagrams depicting implementations of computing devices useful in connection with the methods and systems described herein.
Figure 1D:
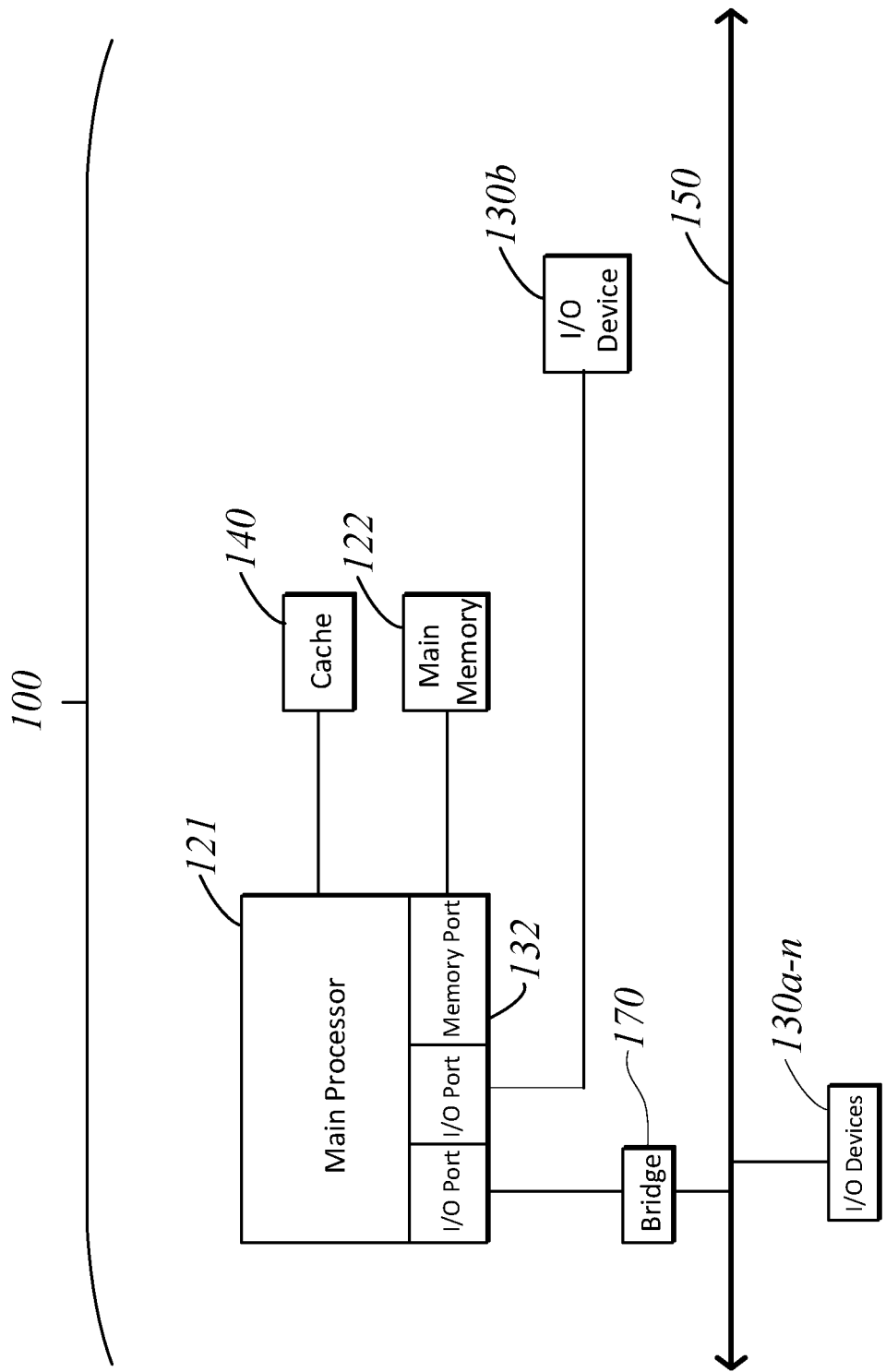

The client 102 and server 106 may be deployed as and/or executed on any type and form of computing device, e.g., a computer, network device, or appliance capable of communicating on any type and form of network 104 and performing the operations described herein. FIGS. 1C and 1D depict block diagrams of a computing device 100 useful for practicing an implementation of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g., a mouse. The storage device 128 may include, without limitation, an operating system, software, and broadcast platform 120, which can implement any of the features of the event processing system 205 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many implementations, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by NVidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism; thread level parallelism, different levels of cache 140, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some implementations, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the implementation shown in FIG. 1C, the processor 121 communicates with main memory 122 via a system bus 150 (described in more detail below). FIG. 1D depicts an implementation of a computing device 100 in which the processor 121 communicates directly with main memory 122 via a memory port 132. For example, in FIG. 1D the main memory 122 may be DRDRAM.

FIG. 1D depicts an implementation in which the main processor 121 communicates directly with cache memory 140 via a secondary bus, sometimes referred to as a backside bus. In other implementations, the main processor 121 communicates with cache memory 140 using the system bus 150. Cache memory 140 typically has a faster response time than main memory 122 and is typically provided by SRAM, BSRAM, or EDRAM. In the implementation shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For implementations in which the I/O device 130 is a video display 124, the processor 121 may use an Advanced Graphics Port (AGP) to communicate with the display 124 or the I/O controller 123 for the display 124. FIG. 1D depicts an implementation of a computer 100 in which the main processor 121 communicates directly with I/O device 130b or other processors 121' via HYPER-TRANSPORT, RAPIDIO, or INFINIBAND communications technology. FIG. 1D also depicts an implementation in which local busses and direct communication are mixed: the processor 121 communicates with I/O device 130a using a local interconnect bus 150 while communicating with I/O device 130b directly.

A wide variety of I/O devices 130a-130n may be present in the computing device 100. Input devices may include keyboards 126, mice 127, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices 130 may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WIT, Nintendo WII U GAMEPAD, or Apple IPHONE. Some devices 130a-130n can allow gesture recognition inputs through combining some of the inputs and outputs. Some devices 130a-130n provide for facial recognition that may be utilized as an input for different purposes including authentication and other commands. Some devices 130a-130n provide for voice recognition and inputs, including, e.g., Microsoft KINECT, SIRI for IPHONE by Apple, Google Now, or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a tabletop or on a wall, and may interact with other electronic devices. Some I/O devices 130a-130n, display devices 124a-124n, or group of devices may be augment reality devices. The I/O devices 130 may be controlled by an I/O controller 123 as shown in FIG. 1C. The I/O controller 123 may control one or more I/O devices 130, such as, e.g., a keyboard 126 and a pointing device 127, e.g., a mouse or optical pen. Furthermore, an I/O device 130 may also provide storage 128 and/or an installation medium 116 for the computing device 100. In still other implementations, the computing device 100 may provide USB connections (not shown) to receive handheld USB storage devices. In further implementations, an I/O device 130 may be a bridge 170 between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some implementations, display devices 124a-124n may be connected to I/O controller 123. Display devices 124 may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some implementations, display devices 124a-124n or the corresponding I/O controllers 123 may be controlled through or have hardware support for OPENGL or DIRECTX API or other graphics libraries.

In some implementations, the computing device 100 may include or connect to multiple display devices 124a-124n, which each may be of the same or different type and/or form. As such, any of the I/O devices 130a-130n and/or the I/O controller 123 may include any type and/or form of suitable hardware, software 110, or combination of hardware and software 110 to support, enable, or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one implementation, a video adapter may include multiple connectors to interface to multiple display devices 124a-124n. In other implementations, the computing device 100 may include multiple video adapters, with each video adapter connected to one or more of the display devices 124a-124n. In some implementations, any portion of the operating system of the computing device 100 may be configured for using multiple displays 124a-124n. In other implementations, one or more of the display devices 124a-124n may be provided by one or more other computing devices 100a or 100b connected to the computing device 100, via the network 104. In some implementations, software 110 may be designed and constructed to use another computer's display device 124b as a second display device 124a for the computing device 100. For example, in one implementation, an Apple iPad may connect to a computing device 100 and use the display 124b of the device 100 as an additional display screen that may be used as an extended desktop. One ordinarily skilled in the art will recognize and appreciate the various ways and implementations that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software 110, and for storing application software programs such as any program related to the broadcast platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid-state hybrid drives that combine hard disks with solid-state cache. Some storage devices 128 may be non-volatile, mutable, or read-only. Some storage devices 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 102 may not require a non-volatile storage device 128 and may be thin clients 102 or zero clients 102. A storage devices 128 may also be used as an installation device 116, and may be suitable for installing software 110 and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client devices 102 may also install software 110 or applications from an application distribution platform. Examples of application distribution platforms include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform may facilitate installation of software 110 on a client device 102. An application distribution platform may include a repository of applications on a server 106 or a cloud 108, which the clients' 102a-102n may access over a network 104. An application distribution platform may include applications developed and provided by various developers. A user of a client device 102 may select, purchase, and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one implementation, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network 104 capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; Linux, a freely-available operating system, e.g., Linux Mint distribution ("distro") or Ubuntu, distributed by Canonical Ltd. of London, United Kingdom; Unix or other Unix-like derivative operating systems; and Android, designed by Google, of Mountain View, California, among others. Some operating systems, including, e.g., the CHROME OS by Google, may be used on zero clients 102 or thin clients 102, including, e.g., CHROMEBOOKS.

The computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 100 has sufficient processor power and memory capacity to perform the operations described herein. In some implementations, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some implementations, the computing device 100 is a gaming system. For example, the computing device 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, or an XBOX ONE S device manufactured by the Microsoft Corporation of Redmond, Washington.

In some implementations, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some implementations, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some implementations, the computing device 100 is a tablet, e.g., the IPAD line of devices by Apple; GALAXY TAB family of devices by Samsung; or KINDLE FIRE, by Amazon.com, Inc. of Seattle, Washington. In other implementations, the computing device 100 is an eBook reader, e.g., the KINDLE family of devices by Amazon.com, or NOOK family of devices by Barnes & Noble, Inc. of New York City, New York.

In some implementations, the communications device 102 includes a combination of devices, e.g., a smartphone combined with a digital audio player or portable media player. For example, one of these implementations is a smartphone, e.g., the IPHONE family of smartphones manufactured by Apple, Inc.; a Samsung GALAXY family of smartphones manufactured by Samsung, Inc.; or a Motorola DROID family of smartphones. In yet another implementation, the communications device 102 is a laptop or desktop computer equipped with a web browser and a microphone and speaker system, e.g., a telephone headset. In these implementations, the communications devices 102 are web-enabled and can receive and initiate phone calls. In some implementations, a laptop or desktop computer is also equipped with a webcam or other video capture device that enables video chat and video call.

In some implementations, the status of one or more machines 102 and 106 in the network 104 are monitored, generally as part of network management. In one of these implementations, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these implementations, this information may be identified by one or more metrics, the one or more metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Generating Notification Interfaces Based on Media Broadcast Access Events

Conventionally, broadcast receiver systems or devices, such as cable boxes, set top boxes, and satellite receiver boxes, operate using fixed hardware and software that does not enable third-party communications with external sources. For example, although cable boxes may communicate with broadcast provider systems, such as cable providers or other broadcast providers, such receiver boxes are generally unable to display additional content or monitor the broadcast content displayed by broadcast provider systems. Further, even if such broadcast receiver devices include applications that can communicate with third-party servers, these devices do not include the capabilities to display content or application information at the same time (e.g., in a seamless manner) as broadcast content provided by broadcast systems. The systems and methods of this technical solution these and other issues by extending the functionality of applications and environments on broadcast receiver devices, to provide applications that display additional content, which may include notifications, alerts, or other interactive interfaces, with broadcast content. To do so, a server or other external computing device can generate display instructions for applications executing on such broadcast receiver devices to display additional user interfaces with broadcast content, and transmit those instructions via a computer network or via a proprietary broadcast network maintained by a broadcast provider. In doing so, the additional content, which may include interactive user interfaces, can be displayed such that it that seamlessly integrates the application interfaces with broadcast content provided by a broadcast provider system.

The systems and methods of this technical solution provide techniques for improved broadcast content management systems, which can provide additional notifications, alerts, or other content in connection with broadcast content. In conventional broadcast systems, a broadcast receiver device, such as a cable box, a set top box, or a cable-enabled smart television, receives broadcast content from a broadcast provider system. In general, it is challenging to provide customized content streams to players that engage with live broadcast content via a broadcast receiver device. The systems and methods described herein solve these and other issues by generating instructions to display additional notifications, alerts, interactive content, and other information in connection with broadcast content at a broadcast receiver device. These issues are compounded when considering the scenario where real-time content to be presented with broadcast content is changing in step with live broadcast events. It is challenging to provide content, or changes to or updates to content, based on the changed conditions of live events that occur in real-time. The systems and methods described herein solve these and other issues by generating instructions to display additional notifications, alerts, and other information in real-time, such that real-time updated content streams are displayed with live broadcast content at a broadcast receiver device.

The systems and methods of this technical solution provide techniques for improved event processing systems that determine arrangements of additional notifications, alerts, and additional content to display with broadcasts of content. In particular, the systems and methods described herein can implement an event processing system, which can generate and provide instructions to display real-time content in connection with live broadcasts. The event processing system described herein can be implemented, for example, in a cloud-computing environment, such as the cloud-computing environment 108 described herein in conjunction with FIGS. 1A and 1B. The improved broadcast management techniques implemented by the event processing systems described herein can determine arrangements of notifications based on a variety of factors. For example, the arrangement can be determined based on attributes of historic live broadcasts accessed by a broadcast receiver device that will display the notifications. In addition, a frequency or type of interaction with webpages or other information resources relating to live broadcasts, as indicated in a player profile, can affect the arrangement of notifications on a corresponding broadcast receiver device. Examples of such interactions include wagers (e.g., bets on sporting events, etc.), selection of players for a fantasy sports lineup, selection of content relating to a fantasy sports lineup, modifying a player profile, or accessing one or more information resources related to current, upcoming, or historic live events.

The systems and methods described herein leverage cloud computing and live event technology to provide interactive content with live events displayed as broadcast content to end player devices, such as cable-boxes, set top boxes, or smart televisions. Although certain aspects of the computing systems described herein are represented as taking place over a network, it should be understood that similar operations can take place on an event processing system, such as a sportsbook machine, or another type of independent live event systems that may not require communications between an event processing system and a separate live event client and/or broadcast receiver to effectuate the operations described herein. These and other features of event processing systems are described in greater detail herein below.

As described herein, the term "broadcast event" can refer to any event that is broadcasted via a broadcast provider system (e.g., DIRECT TV, XFINITY, etc.). These broadcast events can be either live, pre-recorded, and/or re-runs. For example, broadcast events can include sport games, poker matches, Olympic games, live reality shows, and live game shows, among other live events. While the systems and methods disclosed herein generally refer to sporting events or sports games, these are merely examples of the present techniques, and should not be considered limiting.

In addition, the term "broadcast" need not necessarily be limited to content provided via proprietary television networks (e.g., cable, fiber-optic, satellite, etc.). Indeed, the term "broadcast," as used herein, may be used to describe both television content and live-streaming content provided via computer networks from one or more servers. Such live streams may be provided to various client devices or broadcast receiver devices via one or more computer networks. The live streams may depict live events such as sport games, poker matches, Olympic Games, live reality shows, and live game shows, among other live events.

Figure 2:
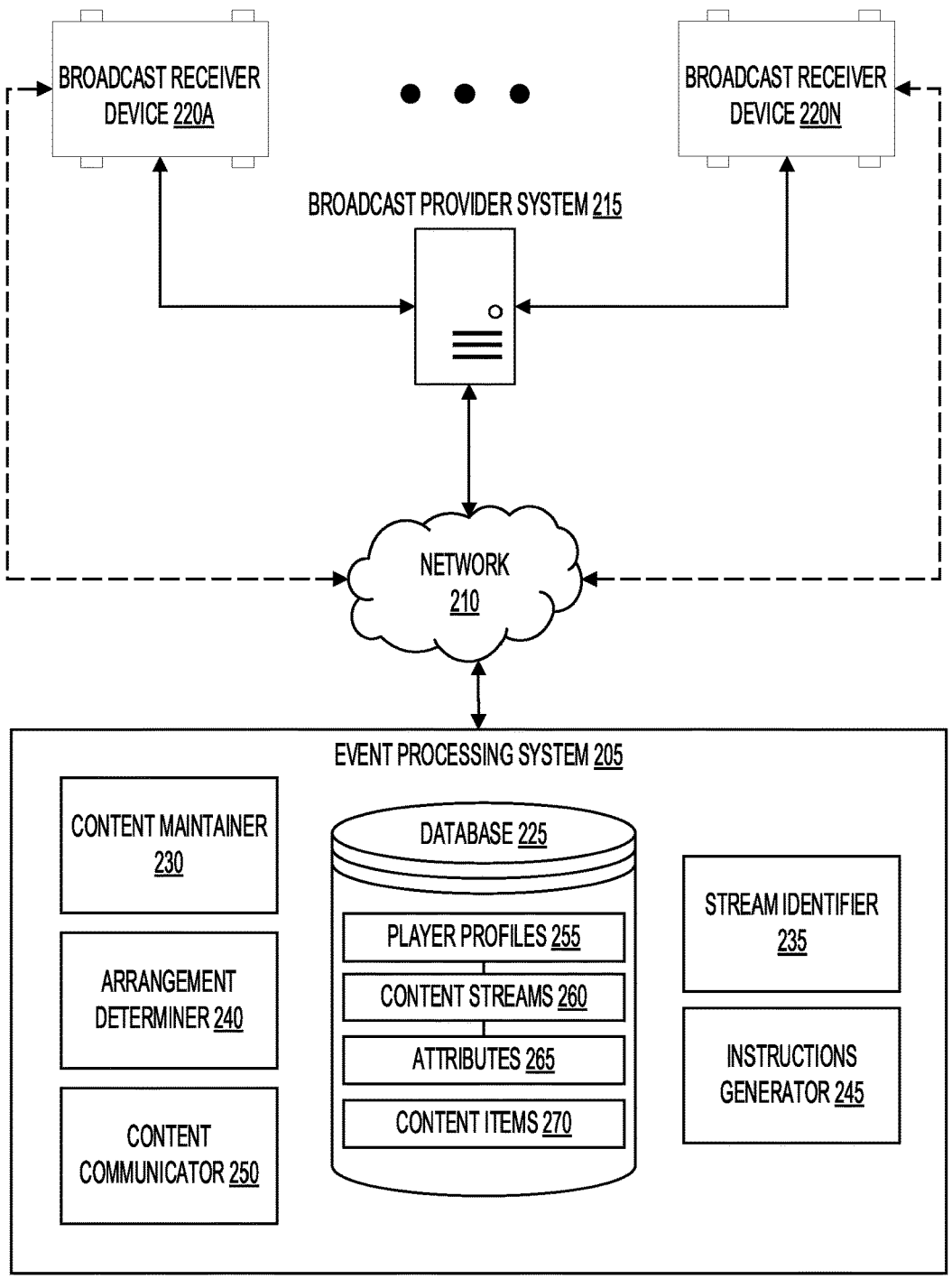
FIG. 2 is a block diagram of an example system for generating notification interfaces based on media broadcast access events, in accordance with one or more implementation.

Referring now to FIG. 2, illustrated is a block diagram of an example system 200 generating notification interfaces based on interactions with broadcast events, in accordance with one or more implementation. The system 200 can include at least one event processing system 205, at least one network 210, at least one broadcast provider system 215, and one or more broadcast receiver devices 220A-220N (sometimes generally referred to as "broadcast receiver device(s) 220" or "receiver device(s) 220"). The event processing system 205 can include at least one content maintainer 230, at least one stream identifier 235, at least one arrangement determiner 240, at least one instructions generator 245, at least one content communicator 250, and at least one database 225. The database 225 can include one or more player profiles 255, data structures corresponding to one or more content streams 260 (sometimes generally referred to herein as the "content streams 260"), data structures corresponding to attributes 265 (sometimes generally referred to herein as the "attributes 265"), and one or more content items 270 (sometimes generally referred to as the "content item(s) 270"). In some implementations, the database 225 can be external to the event processing system 205, for example, as a part of a cloud computing system or an external computing device in communication with the devices (e.g., the event processing system 205, the broadcast provider system 215, the broadcast receiver devices 220, etc.) of the system 200 via the network 210 or via another type of communication network (e.g., a cable network, a fiber network, or another type of broadcast network, etc.).

Each of the components (e.g., the event processing system 205, the network 210, the broadcast provider systems 215, the broadcast receiver devices 220, the content maintainer 230, the stream identifier 235, the arrangement determiner 240, the instructions generator 245, the content communicator 250, the database 225, etc.) of the system 200 can be implemented using the hardware components or a combination of software with the hardware components of a computing system, such as the computing system 100 detailed herein in conjunction with FIGS. 1A-1D, or any other computing system described herein. Each of the components of the event processing system 205 can perform the functionalities detailed herein.

The event processing system 205 can include at least one processor 121 and a memory 122, e.g., a processing circuit.

The memory 122 can store processor-executable instructions that, when executed by processor 121, cause the processor 121 to perform one or more of the operations described herein. The processor 121 may include a microprocessor, an application-specific integrated circuit (ASIC), a field-programmable gate array (FPGA), etc., or combinations thereof. The memory 122 may include, but is not limited to, electronic, optical, magnetic, or any other storage or transmission device capable of providing the processor 121 with program instructions. The memory 122 may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The event processing system 205 can include one or more computing devices 100 or servers 106 that can perform various functions as described herein. The event processing system 205 can include any or all of the components and perform any or all of the functions of the computer device 100 described herein in conjunction with FIGS. 1A-1D.

The network 210 can include computer networks such as the Internet, local, wide, metro, or other area networks, intranets, and satellite networks, other computer networks such as voice or data mobile phone communication networks, and combinations thereof. The event processing system 205 of the system 200 can communicate via the network 210, for instance with the broadcast provider system 215. The network 210 may be any form of computer network that can relay information between the event processing system 205, the broadcast provider systems 215, and one or more information sources, such as web servers 106 or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections.

Any or all of the computing devices described herein (e.g., the event processing system 205, the broadcast provider systems 215, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the event processing system 205, the broadcast provider system 215, etc.) may also communicate wirelessly with the computing devices of the network 210 via a proxy device (e.g., a router, network switch, or gateway). In some implementations, the network 210 can be similar to or can include the network 104 or the cloud 108 described herein in conjunction with FIGS. 1A and 1B. In some implementations, the broadcast receiver devices 220 may communicate via the network 210 with the event processing system 205. However, in some implementations, the broadcast receiver devices 220 may communicate with the event processing system 205 only via the broadcast provider system 215, as described herein.

The broadcast provider system 215 can include at least one processor (e.g., the CPU 121 described in connection with FIGS. 1C and 1D) and a memory (e.g., the memory 122 described in connection with FIGS. 1C and 1D), e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The broadcast provider system 215 can include one or more computing devices (e.g., the computing devices 100 described in connection with FIGS. 1C and 1D) or servers (e.g., the servers 106 described in connection with FIGS. 1C and 1D) that can perform various functions as described herein. The broadcast provider system 215 can include any or all of the components and perform any or all of the functions of the computer device 100 described herein in conjunction with FIGS. 1A-1D. The broadcast provider system 215 can include similar features and functionality of the client devices 102 or the servers 106 described herein in conjunction with FIGS. 1A-1D.

The broadcast provider system 215 can be implemented using hardware or a combination of software and hardware. In some implementations, the broadcast provider system 215 can be configured to provide cable services. The cable services can be provided via a cable distribution network or over the network 210. A cable distribution network can connect the distribution source (e.g., broadcast provider system 215) to the equipment of a player (e.g., broadcast receiver device 220). In some implementations, the connection can be a hard-wired cable network utilizing coaxial, twisted-pair, and fiber-optic, among others. In various implementations, the connection can be a wireless network 210 utilizing a mobile network (e.g., 4G, 5G, 6G), and satellites, among others.

Additionally, in some implementations, the broadcast provider system 215 can include an input device that couples to and communicates with the various computing devices described herein. For example, the broadcast provider system 215 may be configured to relay data received from the broadcast receiver devices 220, or other client computing devices, to the event processing system 205. In another example, the broadcast provider system 215 may receive instructions from the event processing system 205 and subsequently communicate with each broadcast receiver device 220 that is identified in the instructions. The instructions can be, for example, display instructions, that cause content (e.g., the content items 270 described in greater detail herein below) to be displayed in connection with broadcast content provided by the broadcast provider system 215.

Figure 3A:
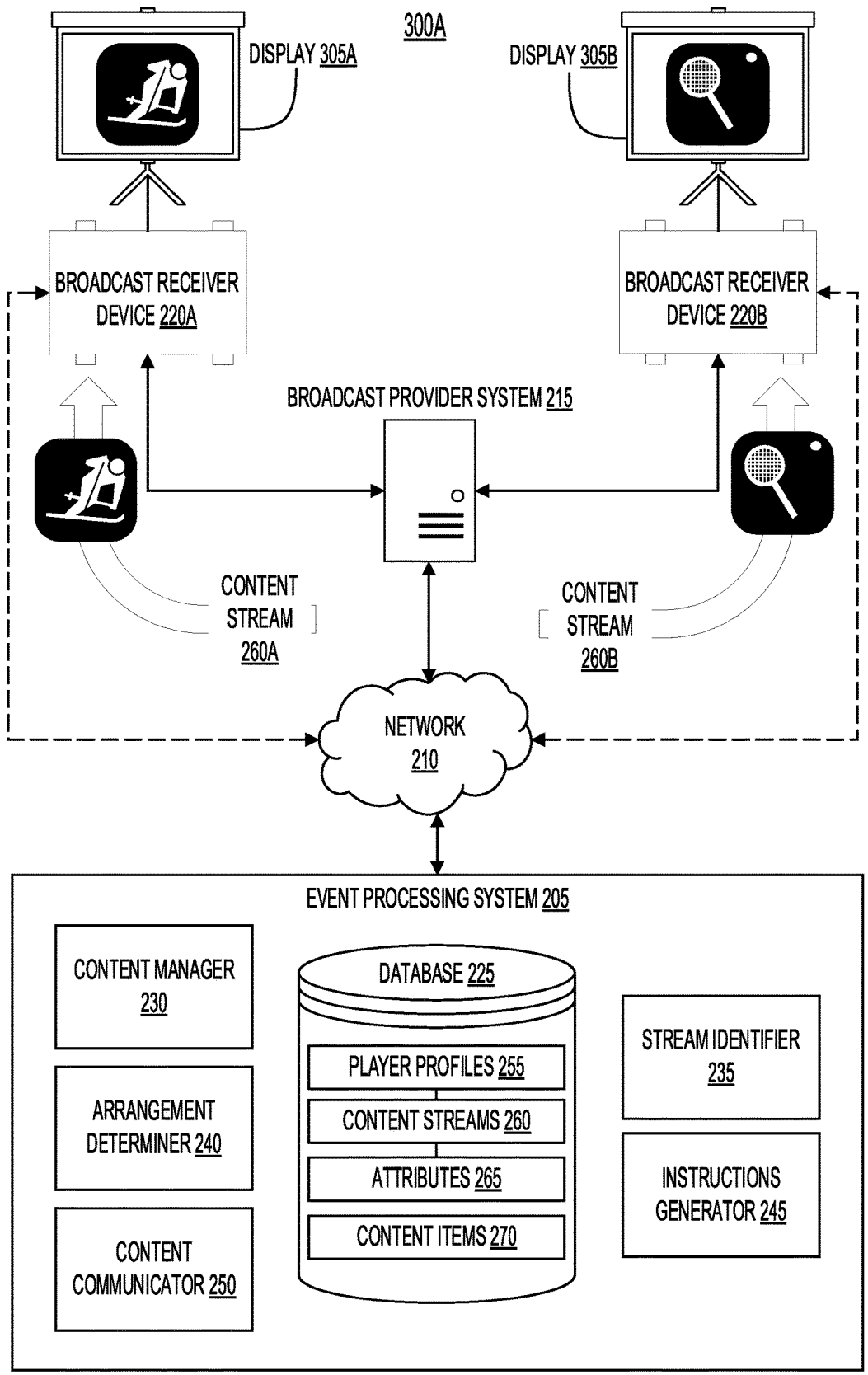
FIGS. 3A, 3B, 3C, and 3D illustrate example flow diagrams for displaying notifications, alerts, or other information in conjunction with content broadcasts, in accordance with one or more implementation.
Figure 3B:
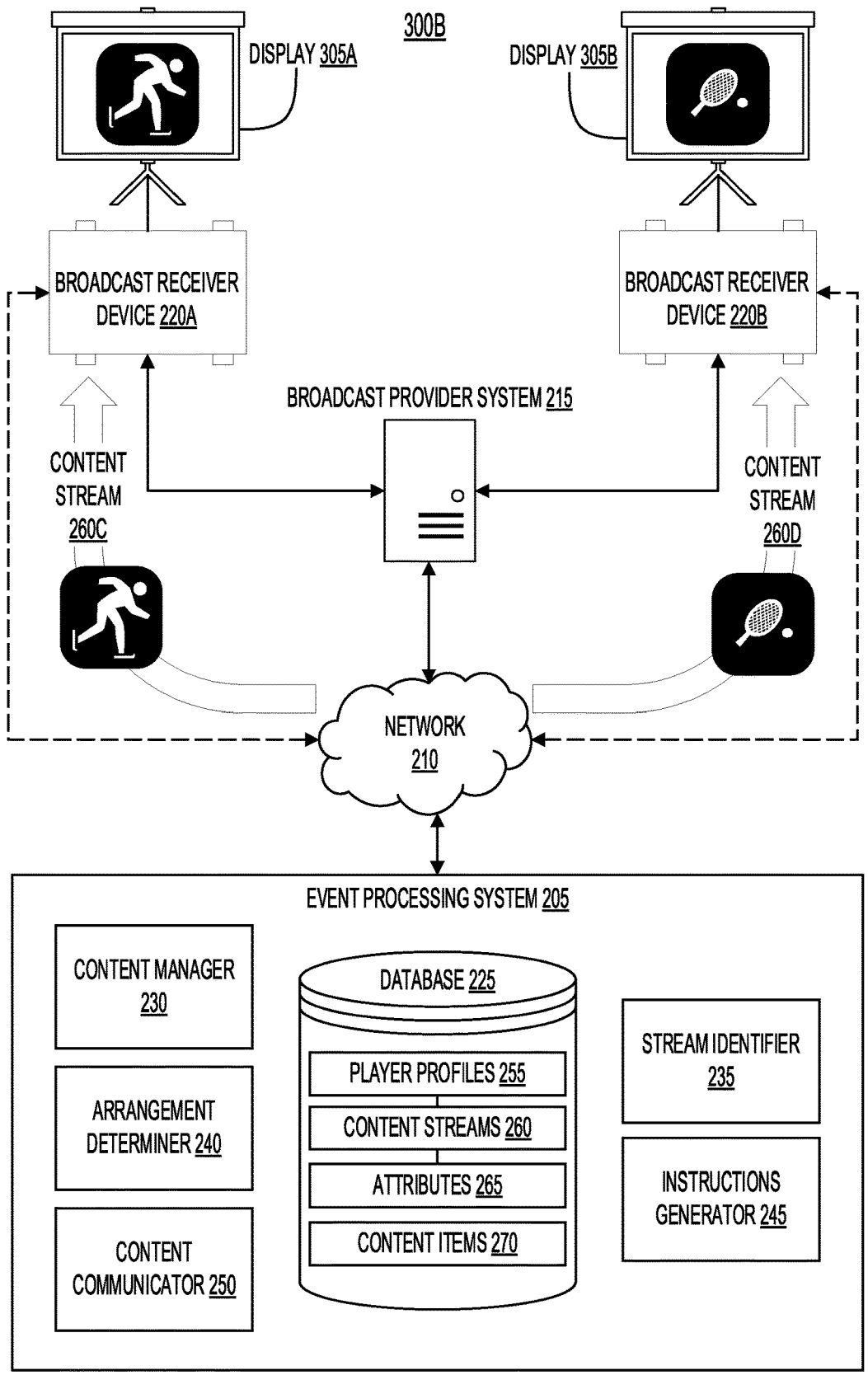
Figure 3C:
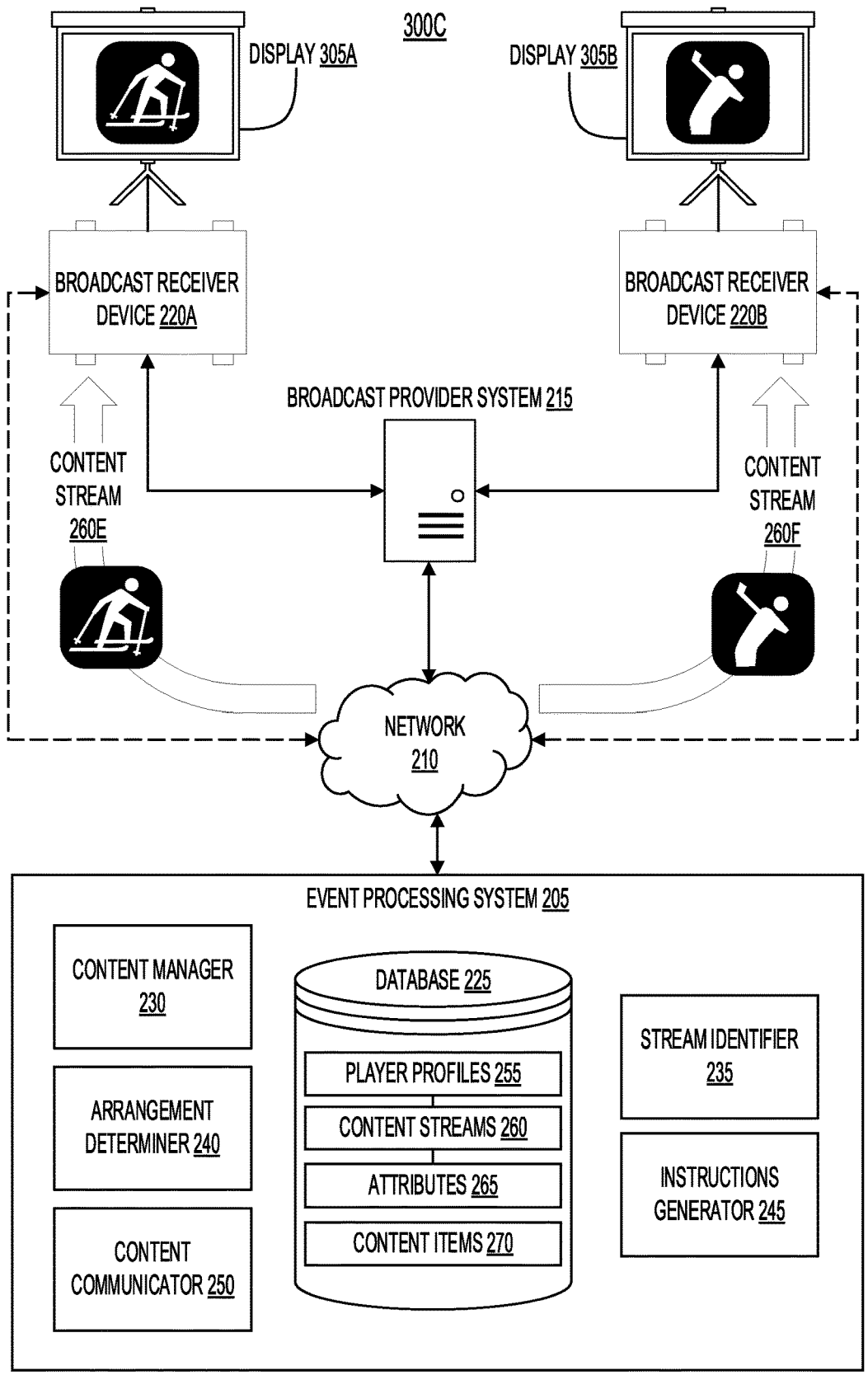

Some example flows of content streams 260 are shown in FIGS. 3A, 3B, and 3C. The content streams 260 can be broadcast content (e.g., TV show) or live streamed content (e.g., news show) that is provided by the broadcast provider system 215, internet streaming services, or cable sources. The broadcast provider system 215 can provide or transmit the content streams 260 to the broadcast receiver device 220, for example, via a proprietary broadcast network, or via a computer network such as the Internet. The content streams 260 can include, for example, media content (e.g., movies, shows, scores, highlight videos, news stories, weather reports, etc.) associated with an event (e.g., a live event, a sporting event, etc.). Data structures corresponding to the content streams 260 may include any information corresponding to the event depicted in the content stream 260 (e.g., identifiers of one or more teams participating in the event, identifiers of one or more event players participating in the event, identifiers of one or more fantasy sports lineups, etc.). In some implementations, the event processing system 205 can retrieve content streams 260 (e.g., from a streaming service, a third-party data provider, from an internal database, from the broadcast provider system 215, etc.) of the a live event, and subsequently provide or transmit the retrieved content streams 260 to one or more broadcast receiver devices 220, for example, in response to a request from the broadcast receiver device 220.

In some implementations, the broadcast receiver system 215 can access third-party information, such as information related to live sporting events or other live events, to provide up-to-date content to the broadcast receiver devices 220 according to the display instructions. For example, in some implementations, display instructions received from the event processing system 205 can indicate that one or more portions of content should include up-to-date or near real-time information, which can change based on real-time conditions of a live event. In such implementations, the broadcast provider system 215 can access one or more third-party information sources, which may include the event processing system 205, to provide up-to-date information to the broadcast receiver devices 220, in addition to the display instructions received from the event processing system 205.

In some implementations, the broadcast provider system 215 can further provide broadcast content or other types of content streams 260 via digital or analog television signals, or otherwise encoded signals via a proprietary network, to the broadcast receiver devices 220. The broadcast provider system 215 may communicate with broadcast receiver devices 220, such as more cable boxes, set top boxes, or other types of devices that can receive content streams 260. The broadcast provider system 215 may communicate with the broadcast receiver devices 220 via a cable network (e.g., via one or more cable modem termination systems, etc.). In some implementations, the broadcast provider system 215 can communicate with the broadcast receiver devices 220 via a hybrid fiber-coaxial infrastructure that delivers content streams 260 or broadband services. In some implementations, the broadcast provider system 215 may communicate with the broadcast receiver devices 220 via a fiber-optic network infrastructure that can deliver content streams 260 or broadband services. In such implementations, the broadcast receiver devices 220 can be, or may include, optical network termination units or gateways. In some implementations, the broadcast provider system 215 may transmit broadcast content data or content stream data (and in some implementations, instructions received from the event processing system 205) via one or more satellites. In such implementations, the broadcast receiver devices 220 may be communicatively coupled to one or more satellite receiver dishes, and can receive the information transmitted by the broadcast provider system 215 via transmissions from the satellites. The broadcast provider system 215 may communicate via one or more communication interfaces with any such proprietary broadcast network or broadband service network to provide content streams 260, or display instructions received from the event processing system 205 or external content provider (not pictured) as described herein.

Each of the broadcast receiver devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The broadcast receiver devices 220 can include one or more computing devices or servers that can perform various functions as described herein. The one or more broadcast receiver devices 220 can include any or all of the components and perform any or all of the functions of the computer device 100 described herein in conjunction with FIGS. 1A-1D. The broadcast receiver devices 220 can include similar features and functionality of client devices 102 described herein in conjunction with FIGS. 1A-1D.

Each broadcast receiver device 220 can include, but is not limited to, a cable box (cable converter box, or television converter box), a set-top box, a satellite receiver, a special-use PC Card device (e.g., CableCard, AllVid), a television device, a mobile device, or another type of computing device. Cable boxes can convert digital television signals to analog or digital signals that can be decoded and displayed by a television, or unscramble a television signal provided by the broadcast provider system 215 or the event processing system 205. Set-top boxes can enable a television, or another type of display device to receive and device digital television (DTV) broadcasts. A satellite receiver can be a computing device that can be configured to receive and decode radio signals from one or more satellites, which can then be converted into a format that is useable for a television display. Generally, the cable boxes, set-top boxes, and satellite receivers can be tuning devices that can transpose or convert channels from a cable television service (e.g., provided by broadcast provider system 215 or event processing system 205) to an analog or digital radio frequency (RF) signal. In some implementations, each broadcast receiver device 220 can be a television or another type of computing device with a converter integrated within the broadcast receiver device 220 (e.g., within a same enclosure).

Each broadcast receiver device 220 can be implemented using hardware or a combination of software and hardware. In some implementations, each broadcast receiver device 220 can be configured to receive cable services from the broadcast provider system 215. In various implementations, a broadcast receiver device 220 can include a display (e.g., display 305) or display portion. Alternatively, the broadcast receiver device 220 can be configured to provide a converted signal for display on a display device such as a television or a monitor. The display can include a display portion of a television, a display portion of a computing device, a graphical user interface (GUI), or another type of interactive display (e.g., a touchscreen, a display, etc.) and one or more input/output (I/O) devices (e.g., a remote, a mouse, a keyboard, a digital keypad, a gamepad, etc.).

The display can include a touch screen displaying an application, such as live event windows and/or notification windows described herein. The display can include a border region (e.g., side border, top border, bottom border). In some implementations, the display can include a touch screen display, which can receive interactions from a player. The interactions can result in interaction data, which can be stored and transmitted by the processing circuitry of the broadcast receiver device 220. The interaction data can include, for example, interaction coordinates, an interaction type (e.g., click, swipe, scroll, tap, etc.), and an indication of an actionable object with which the interaction occurred.

In some implementations, a player (e.g., a user of the broadcast receiver device) can interact with actionable objects provided in notifications, alerts, or content using a remote, a gamepad, or some other type of controller that allows selection of user interface elements presented in an application executing on the broadcast receiver device 220. Each broadcast receiver device 220 can include an input device (e.g., a remote, a gamepad, a controller, a keyboard, a mouse, a touchscreen, etc.) that couples or communicates with the display of each client device to enable a player to interact with and/or select one or more actionable objects as described herein. The display can enable interaction with one or more visual indications provided through the display of each broadcast receiver device 220, and responsive to an interaction (e.g., select, click-on, touch, hover), the broadcast receiver device 220 can generate an indication identifying a user input and/or selection of a notification, alert, or an actionable object (e.g., button, selectable content, hyperlink, a user interface element, etc.), among others.

In some implementations, each broadcast receiver device 220 can convert digital television signals to analog signals and/or unscramble a television signal. Upon converting and/or unscrambling the digital television signal, the broadcast receiver device 220 can provide an output to the broadcast receiver device 220 and/or client device. For example, the broadcast receiver device 220 may be an all-in-one computing device configured to receive and configure signals (e.g., from the event processing system 205) and can be configured to display (or stream) content of the television signals on an integrated display of the broadcast receiver device 220. For example, the broadcast receiver device 220 may be a television, a smart television, and/or an internet enabled device with a display, among others. In another example, the broadcast receiver device 220 may be a cable box (or set-top box) configured to receive and configure signals (e.g., from the broadcast provider system 215) and can be configured to display (or stream) content of the television signals on an integrated display of the broadcast receiver device 220 and/or a client device.

In some implementations, the broadcast receiver device 220 may be a computer-enabled television (referred to herein as a "smart television") that receives decoded content streams 260 via a set top box, cable box, or a computing device that receives broadcast satellite signals (a "satellite box"). In such implementations, the broadcast receiver device 220 can receive and display content streams 260 provided by the broadcast provider system 215 via the cable box, set top, or satellite box. The broadcast receiver device 220 can execute one or more applications, which may be associated with as the event processing system 205 described in greater detail herein below. The application executing on the broadcast receiver device 220 can establish one or more communication sessions with the event processing system 205 via the network 210. The application(s) can receive instructions to display notifications as described herein from the event processing system 205, which may be presented on one or more user interfaces with the content streams 260 received via the cable box, set top box, or satellite box. In such implementations, the broadcast receiver device 220 can communicate with the cable box, set top box, or satellite box to perform one or more actions, such as schedule or modify a recording, or to change to a different broadcast channel.

For example, in some implementations, the instructions provided by the event processing system 205 can include instructions to present actionable objects which, when actuated, cause the broadcast receiver device 220 to navigate to and display content streams 260 different from content streams 260 currently being displayed. To do so, the smart television (e.g., the broadcast receiver device 220), upon detecting the actuation, may communicate a request to the cable box, set top box, or satellite box to navigate to content streams 260 identified in the instructions. For example, the instructions may identify a particular channel or channel(s) on which the content streams 260 is being displayed. The broadcast receiver device 220 (or the application executing thereon) can send a request to the cable box, set top box, or satellite box to navigate to the identified channel. In some implementations, the application executing on the smart television (e.g., the broadcast receiver device 220) can communicate with the broadcast provider system 215 to request a channel guide or schedule corresponding to the player associated with the cable box, set top box, or satellite box. Using the channel guide, the application executing on the broadcast receiver device 220 can identify the specific channel on which the content streams 260 identified in the instructions is being provided. Once the channel is identified, the broadcast receiver device 220 can transmit a request to the cable box, set top box, or satellite box to navigate to and display the channel. The broadcast receiver device 220 can communicate with the cable box, set top box, or satellite box via any number of communication protocols, such as a Bluetooth protocol, a Wi-Fi protocol (e.g., web-sockets), or any other type of communication protocol.

In some implementations, the instructions provided by the event processing system 205 can include instructions to present actionable objects which, when actuated, cause the broadcast receiver device 220 to schedule a recording for a broadcast of a live event (or a portion of the broadcast). In some implementations, the instructions may include instructions that cause the broadcast receiver device 220 to schedule a recording for a broadcast of a live event (or a portion of the broadcast), rather than display a corresponding notification. To do so, the smart television (e.g., the broadcast receiver device 220), may communicate a request to the cable box, set top box, or satellite box to record content streams 260 (or a portion of the content streams 260) identified in the instructions. For example, the instructions may identify a particular channel or channels on which the content streams 260 is being displayed, a start time for the recording, an end time for the recording, or a duration of the recording. The broadcast receiver device 220 (or the application executing thereon) can send a request to the DVR, the cable box, set top box, or satellite box to navigate to schedule a recording at the identified channel for at the start time for the live event (or the portion thereof).

In some implementations, the application executing on the smart television (e.g., the broadcast receiver device 220) can communicate with the broadcast provider system 215 to request a channel guide or schedule corresponding to the player associated with the cable box, set top box, or satellite box. Using the channel guide, the application executing on the broadcast receiver device 220 can identify the specific channel on which the content streams 260 identified in the instructions is being provided, as well as the duration of the broadcast (or an identified portion of the broadcast). Once the channel, start time, and end time are identified, the broadcast receiver device 220 can transmit a request to the DVR, cable box, set top box, or satellite box to schedule a recording for the identified content streams 260 on the identified channel at the identified start time (until the identified end time, e.g., based on the duration of the recording). The broadcast receiver device 220 can communicate with the DVR, cable box, set top box, or satellite box via any number of communication protocols, such as a Bluetooth protocol, a Wi-Fi protocol (e.g., web-sockets), or any other type of communication protocol. The broadcast receiver device 220 can utilize one or more APIs corresponding to the DVR, cable box, set top box, or satellite box, which can provide functions to schedule or modify recordings according to requests.

Each broadcast receiver device 220 can be associated with a device identifier, which can be specific to each respective broadcast receiver device 220. The device identifier can include a script, code, label, or marker that identifies a particular broadcast receiver device 220. In some implementations, the device identifier can include a string of one or more numbers, letters, characters or any combination numbers, letters, and characters. In some implementations, each broadcast receiver device 220 can have a unique device identifier. Each broadcast receiver device 220 can execute a client application, which can be a live event application that communicates with the event processing system 205 to receive content streams 260, notifications, alerts, or additional content, with content streams 260 displayed by the broadcast receiver device 220. The client application can include a user application executing on each broadcast receiver device 220 or provided to the broadcast receiver device 220 by a server (e.g., the event processing system 205, one or more servers, etc.). The application can include a web application, a server application, a resource, a desktop, or a file. In some implementations, the application can include a local application (e.g., local to a broadcast receiver device 220), hosted application, SaaS application, virtual application, mobile application, and other forms of content. In some implementations, the application can include or correspond to applications provided by remote servers or third-party servers. In some implementations, the application can access or identify the player profiles 255, the content streams 260, the attributes 265, or the content items 270 stored and maintained at the database 225. The application can present one or more notifications, alerts, or content items 270, which can include one or more actionable objects, such as the actionable objects described herein below in conjunction with FIGS. 4A-4C, to a player through a broadcast receiver device 220. Such actionable objects can include user-selectable hyperlinks, buttons, graphics, videos, images, user interface elements, or other interactive user interface elements that generate a signal that is processed by the application executing on the respective broadcast receiver device 220.

In some implementations, the broadcast receiver devices 220 can establish one or more communication sessions with the event processing system 205 or the broadcast provider system 215. In implementations where the broadcast receiver devices 220 communicates with the event processing system 205 via the broadcast provider system 215, the broadcast receiver devices 220 can communicate messages to and from the event processing system 205 via the proprietary communication network 210 of the broadcast provider system 215. The broadcast provider system 215 can then relay those messages to and from the event processing system 205 to facilitate communication (or a communication session) between the broadcast receiver devices 220 and the event processing system 205. The one or more communication sessions can each include a channel or connection between the event processing system 205 and the one or more broadcast receiver devices 220. The one or more communication systems can each include an application session (e.g., virtual application), an execution session, a desktop session, a hosted desktop session, a terminal services session, a browser session, a remote desktop session, a URL session, and/or a remote application session. Each communication session can include encrypted and/or secure sessions, which can include an encrypted file, encrypted data, or traffic. Such communication sessions can be used to request and provide up-to-date content items 270 for display with content streams 260, as described herein.

Each of the broadcast receiver devices 220 can be computing devices configured to communicate via the network 210 to access information resources, such as web pages via a web browser, or application resources via a native application executing on a broadcast receiver device 220. In some implementations, each of the broadcast receiver devices 220 can be configured to communicate via the network 210 with an external content provider (not pictured) to receive the content streams 260 or other media content. When accessing information resources, the broadcast receiver device 220 can execute instructions (e.g., embedded in the native applications, in the information resources, etc.) that cause the broadcast receiver devices 220 (or client devices 102 described herein in conjunction with FIGS. 1A-1D) to display one or more content streams 260 received from the broadcast provider system 215, such as the content streams 260 described herein below in conjunction with FIGS. 3A-3D. In addition, the broadcast receiver device 220 may execute instructions received.

The broadcast receiver device 220 (or an application executing on the broadcast receiver device 220) can receive, from the event processing system 205, instructions to display a notification, an alert, a content stream 260, a content item 270, or other media content. The content streams 260 can be provided to the broadcast receiver devices 220 by a variety of computing systems. For example, content streams 260, such as cable or satellite television, or video on-demand content can be provided via the broadcast provider system 215. Likewise, live stream content or web-based content streams 260 (e.g., video streams, etc.) can be provided via the event processing system 205 or from an external computing system (not pictured) via the network 210. In implementations where the broadcast receiver device 220 is a smart television in communication with a cable box, set top box, or satellite box, the an application executing at the broadcast receiver device 220 may communicate with the cable box, set top box, or satellite box to identify one or more comment streams 260 being displayed. The application can store information related to the content streams 260, and subsequently transmit the content stream 260 information to the event processing system 205 (e.g., in response to a request, in response to detecting a player is watching a content stream 260 provided via the cable box, set top box, or satellite box, etc.). The event processing system 205 can store the information relating to the content streams 260 as part of the player profile 255, including any relevant metadata (e.g., duration spent watching the content stream, an identifier of a live event in the content stream 260, etc.). In some implementations, the broadcast receiver devices 220 may be computing devices that receive broadcast content in the form of a live-stream video, for example, via the internet.

Live stream videos of live events may be provided via web-based or native application interfaces, and may be received by the broadcast receiver devices 220 via one or more suitable computer networks (e.g., the network 210). In such implementations, the broadcast provider system 215 may be a provider of live stream broadcast content, and can provide the live stream broadcast content via the network 210. Similarly, the broadcast receiver devices 220 may be any type of computing device capable of receiving live stream content via a computer network.

In some implementations, an external content provider (not pictured) can generate or provide the content streams 260 via the network 210 to an application executing at the broadcast receiver devices 220 (e.g., a streaming application, etc.). In some implementations, the instructions can include data relating to the content items 270. The data relating to content items 270 can include one or more attributes (e.g., wager statistics, odds, potential payout amounts, current wager amounts, aggregate wager amounts on one or more events, upcoming or current critical events or moments, fantasy lineup information in a player profile 255 associated with the broadcast receiver device, event information, etc.) relating to broadcasts of live events. Event information can include one or more data structures that include any information related to an event (e.g., a historic, current, or upcoming event, etc.) such as an event time, event score (e.g., in the case of sporting events, score of one or more teams or players of the event, etc.), wager information (e.g., information about wager opportunities, information about ongoing wagers), information about whether the player has indicated a desire to wager in similar scenarios (e.g., previous activity), or other event information described herein.

Figure 4A:
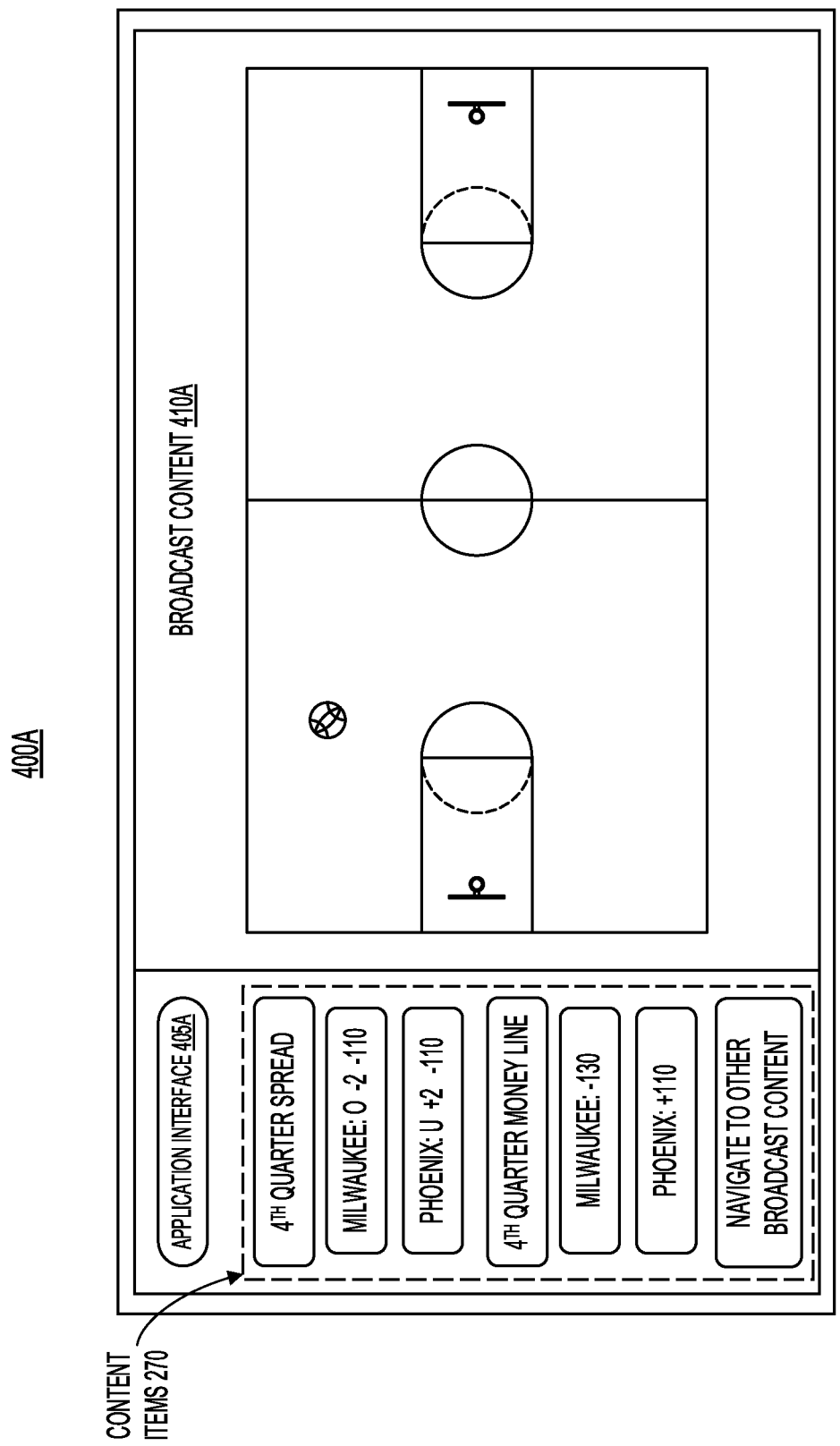
FIGS. 4A, 4B, and 4C illustrate example interfaces for displaying notifications, alerts, or other information in conjunction with content broadcasts, in accordance with one or more implementation.
Figure 4B:
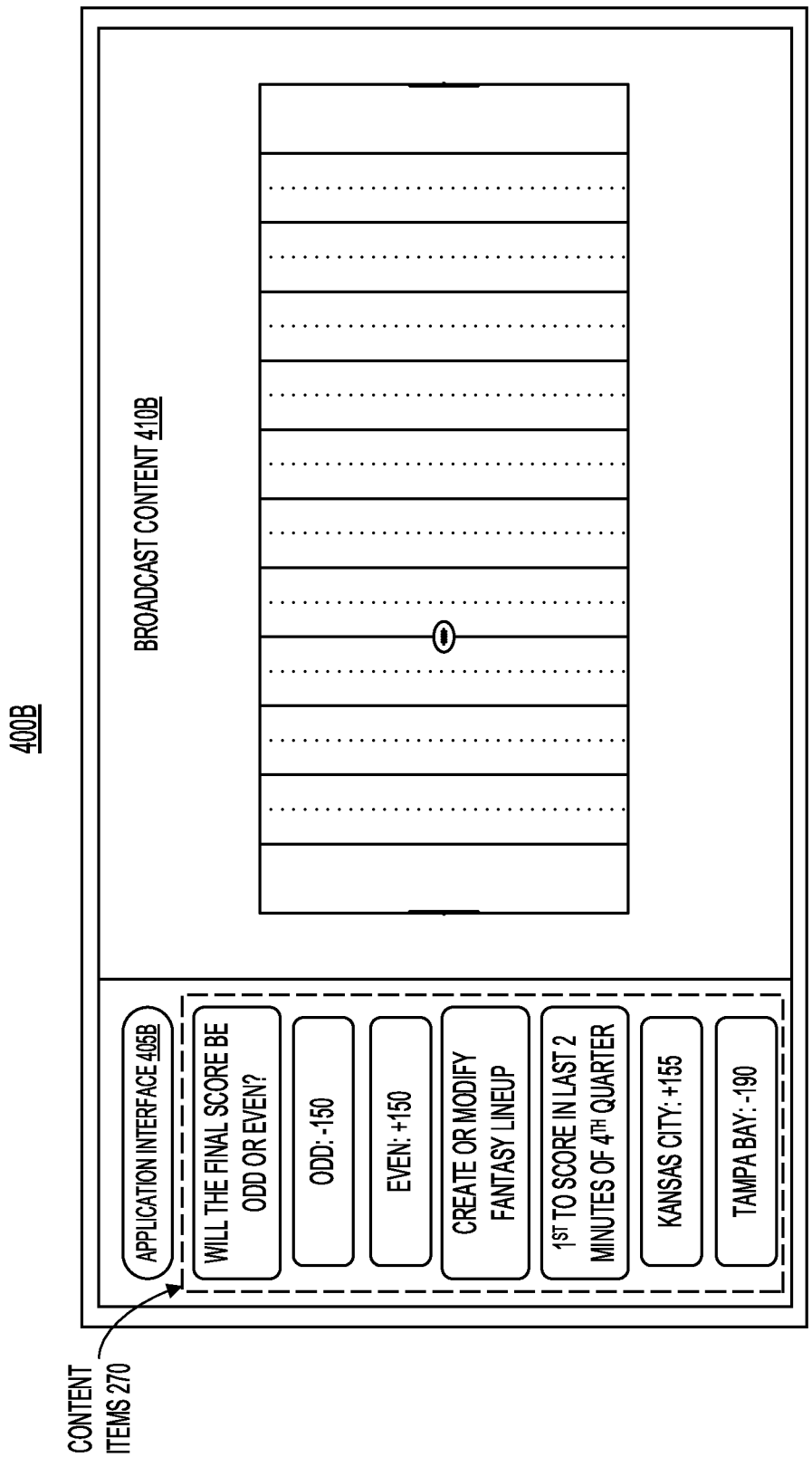
Figure 4C:
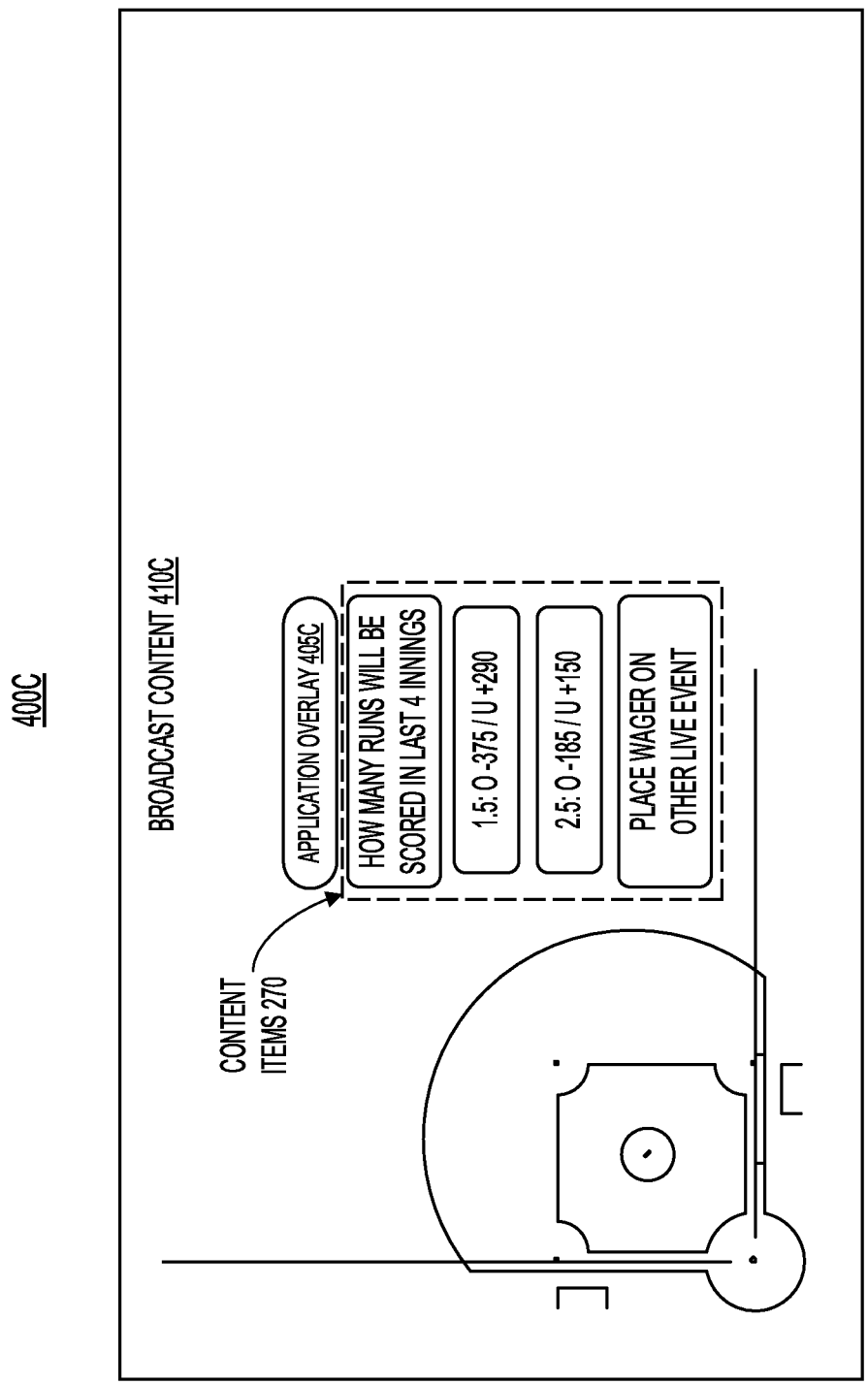

The application executing on the broadcast receiver device 220 can receive instructions to display the notifications, alerts, content items 270 with one or more content streams 260. The user interfaces of the live event application, for example, can be user interfaces that present different types of live events, notifications, alerts, content streams 260, content items 270, or other types of interactive content. In general, the content items 270 can include content (e.g., images, video, animations, graphics, audio, etc.) that can be presented to a player via the input/output interfaces of a display device forming a part of or in communication with the broadcast receiver device 220 executing the application. The application can parse the instructions and execute or otherwise carry out the operations specified in the instructions to display the notifications, alerts, content items 270, or other information from the event processing system 205. Some example interfaces of content items 270 (e.g., notifications, alerts, or other content) being displayed with the content streams 260 is shown in FIGS. 4A, 4B, and 4C.

In some implementations, the application is executed by a display device (e.g., smart TV) that includes network connectivity (e.g., streams music and videos, browses the internet, and views photos). The application executing on the display device can communicate with the broadcast receiver device 220 to receive one or more content streams 260 (e.g., TV shows, video on demand) or other media content from the broadcast provider system 215. In some implementations, the application communicates with the broadcast receiver device 220 via an application programming interface (API) to receive the content stream 260 or other media content from the broadcast provider system 215. The broadcast receiver device 220 can generate instructions for the display device to display the content stream 260 or other media content from the broadcast provider system 215, or can provide the content streams 260 as decoded (e.g., "raw") media content via a media communication protocol (e.g., HDMI) to the display device. The broadcast receiver device 220 can transmit the instructions to the display device. In some implementations, the application executing on the display device can communicate with the broadcast provider system 215 via the broadcast receiver device 220 to receive the content streams 260 or other media content from the broadcast provider system 215. In some implementations, the application executing on the display device can directly communicate with the broadcast provider system 215 to receive the content stream 260 or other media content from the broadcast provider system 215.

In some implementations, the application executing on the display device can communicate with the broadcast receiver device 220 to receive the content items 270 (e.g., notification, alert, wager, etc.) from the event processing system 205. In some implementations, the application communicates with the broadcast receiver device 220 via an application programming interface (API) to receive the content items 270 (e.g., notification, alert, wager, etc.) from the event processing system 205. The broadcast receiver device 220 can generate instructions for the display device to display the content items 270 from the event processing system 205. The broadcast receiver device 220 can transmit the instructions to the display device. In some implementations, the application executing on the display device can communicate with the event processing system 205 via the broadcast receiver device 220 to receive the content items 270 from the event processing system 205. In some implementations, the application executing on the display device can directly communicate with the event processing system 205 to receive the content items 270 from the broadcast provider system 215.

In some implementations, the event information can be updated in real-time on the broadcast receiver device 220 (or display device or client devices 102 described herein in conjunction with FIGS. 1A-1D) as the live event occurs (or progresses) (e.g., as the event is processed by the live event system 205 according to the content items 270 and transmitted to the broadcast receiver devices 220, etc.). The indications of event information can include instructions that cause the broadcast receiver device 220 to display one or more notifications, alerts, or content items 270.

In some implementations, the content items 270 displayed with the content streams 260 are provided through the application at the display device (e.g., smart TV) in one or more portions of the display device. In some implementations, the display can include one or more portions to display content streams 260 (e.g., broadcast content) and one or more different portions to display content items 270 in addition to the content stream 260. For example, the main (e.g., center or full screen) portion of the display can display content streams 260 from the broadcast receiver devices 220 and a side portion (e.g., a side bar, notification windows, border region, etc.) is provided to display the application or content items 270 from the event processing system 205.

In some implementations, the instructions can include an indication that portions of the displayed content items 270 are to be updated in real-time or near real-time. To make sure that the content indicated as real-time or near real-time is up-to-date, the application executing on the broadcast receiver device 220 can query (e.g., ping, transmit a request on a periodic basis, etc.) the event processing system 205 in one or more communication sessions to request up-to-date versions of the indicated content items 270. If updates to the content items 270 are available, the event processing system

205 can transmit the updated content items 270 to the broadcast receiver device 220. In some implementations, the broadcast receiver device 220 can wait to receive updates to the indicated portions of the content items 270, and when the content is received, display the updated content stream 260 with the updated content items 270. Examples of real-time or near real-time content items 270 are shown in FIGS. 4A, 4B, and 4C.

The broadcast receiver devices 220 can receive instructions from the event processing system 205 that can cause the broadcast receiver device 220 to display the notifications, alerts, or content items 270, which can one or more actionable objects, such as the actionable objects described below in conjunction with FIGS. 4A-4C. As described herein, a broadcast receiver device 220 can receive one or more interactions with actionable objects presented on the display of the client device. Interactions can be selections (e.g., made with a remote, a gamepad, a controller, or other input device, etc.) tap interactions, click interactions, or other types of indications that a player is engaged with a particular user interface element. Upon detecting an interaction with a particular user interface element, the broadcast receiver device 220 can execute instructions (e.g., processor-readable code, a script, etc.) that cause the broadcast receiver device 220 to transmit an appropriate signal to the event processing system 205 (e.g., via the broadcast provider system 215, via the network 210, etc.). A signal can include any information specified by the instructions associated with the particular actionable object with which the user interacted. The signals can include, for example, an interaction indication, which can provide any information relating to the content items 270 with which the user interacted (e.g., a wager, a selection of a notification to navigate to other content items 270, selection of a notification to record content streams 260, a request to view a live event associated with a current or potential wager, etc.).

As described herein, a broadcast receiver device 220 and the event processing system 205 can exchange messages directly (or indirectly via broadcast provider system 215) containing information that causes an interactive live event interface to be displayed on the display of the broadcast receiver device 220. The event processing system 205 can provide instructions to display notifications, alerts, and content items 270 to broadcast receiver device 220 that causes the broadcast receiver device 220 (or the application executing on the broadcast receiver device 220) to change the user interface to display the notifications, alerts, and content items 270 with content streams 260 such as a live event. In some implementations, the broadcast receiver devices 220 (or the application executing on the broadcast receiver devices 220) can display said notifications, alerts, and content items 270 in accordance with a content selection policy, a notification display policy, a notification transmission policy, a notification generation policy, or other policies that allow or restrict the display of notifications, alerts, or content items 270. In some implementations, the broadcast receiver device 220 can receive content streams 260 for presentation on the display of the display device in a streaming arrangement (e.g., content is streamed from the event processing system 205 using a streaming protocol, etc.).

In some implementations, to access the functionality of (e.g., communicate with, receive notifications, alerts, and content items 270 from, etc.) the event processing system 205, the broadcast receiver device 220 can login to the event processing system 205 using one or more identifiers of a player profile 255 (described in greater detail herein). In doing so, the broadcast receiver device 220 can receive content items 270, including notifications and alerts, that are related to the attributes of the player profile 255 that is used to access the functionality of the event processing system 205. For example, using the application executing on the broadcast receiver device 220, a player can enter one or more identifiers of a player profile 255, such as a username, a password, an e-mail address, a phone number, a personal identification number (PIN), a secret code-word, or device identifiers for use in a two-factor authentication technique, among others. In some implementations, to link a player profile 255 with the application executing on the broadcast receiver device 220, the application can transmit a request for a code (e.g., a unique code, a broadcast receiver device 220 identifier, a QR code, etc.) to the event processing system 205, which in response can provide the code to the application. The request can include an identifier of the broadcast receiver device 220, which the event processing system 205 can associate with the code. In some implementations, the event processing system 205 can generate the code based on the identifier of the broadcast receiver device 220 (e.g., a hash of the identifier using a hashing algorithm, etc.).

The application can then display the code at a display device in communication with the broadcast receiver device 220. A player can then provide the code as input to an application executing on a client device that is in communication with the event processing system 205. The application executing on the client device can communicate with the event processing system 205, and the player can use the application (e.g., via user input, etc.) to provide a request to the event processing system 205 to associate the code with a particular player profile 255. The event processing system 205 can store the code, and the associated identifier of the broadcast receiver device 220, in association with the identified player profile 255, thereby registering the broadcast receiver device 220 with the player profile 255. When the event processing system 205 communicates with a registered broadcast receiver device 220, the attributes of the associated player profile 255 can be used in the content selection policies described herein. In some implementations, the event processing system 205 can apply one or more notification restriction policies to any notifications that would otherwise be transmitted to the broadcast receiver device 220 based on the attributes of the player profile associated with the broadcast receiver device 220.

The database 225 can be a computer-readable memory that can store or maintain any of the information described herein. The database 225 can maintain one or more data structures, which may contain, index, or otherwise store each of the values, pluralities, sets, variables, vectors, numbers, or thresholds described herein. The database 225 can be accessed using one or more memory addresses, index values, or identifiers of any item, structure, or region maintained in the database 225. The database 225 can be accessed by the components of the event processing system 205, or any other computing device described herein, via the network 210. In some implementations, the database 225 can be internal to the event processing system 205. In some implementations, the database 225 can exist external to the event processing system 205, and may be accessed via the network 210. The database 225 can be distributed across many different computer systems or storage elements, and may be accessed via the network 210 or a suitable computer bus interface.

The event processing system 205 can store, in one or more regions of the memory of the event processing system 205, or in the database 225, the results of any or all computations, determinations, selections, identifications, generations, or calculations in one or more data structures indexed or identified with appropriate values. Any or all values stored in the database 225 may be accessed by any computing device described herein, such as the event processing system 205, to perform any of the functionalities or functions described herein. In some implementations, the database 225 can be similar to or include the storage described herein in connection with FIG. 1C. In some implementations, instead of being internal to the event processing system 205, the database 225 can form a part of the cloud computing system. In such implementations, the database 225 can be a distributed storage medium in a cloud computing system, and can be accessed by any of the components of the event processing system 205 or any other computing devices described herein.

The database 225 can store one or more player profiles 255 associated with a player (e.g., a user) of a client device (e.g., a smartphone, laptop, etc.) or a broadcast receiver device 220 (e.g., via the registration process described herein). The player profile 255 can be stored in association with one or more identifiers of a client device, or a broadcast receiver device 220 that is associated with the corresponding player. The player profile 255 can be a profile that includes information about a player, and information about one or more of the client devices or broadcast receiver device 220 used to access the event processing system 205 using the player profile 255. For example, identifiers of a player profile 255 can be used to access the functionality of the event processing system 205. The identifiers can include a username, a password, an e-mail address, a phone number, a personal identification number (PIN), a secret code-word, or device identifiers for use in a two-factor authentication technique, among others. The player profile 255 can store information about, and be associated with, accessed content streams 260 (e.g., accessed broadcast content, associated live events, etc.) and corresponding attributes 265, content items 270, upcoming live events, fantasy sports lineups (e.g., identifiers of fantasy players, lineups, lineup configurations, fantasy games, and outcomes, etc.) that are performed via the event processing system 205 or computing devices associated with the event processing system 205.

In some implementations, the player profile 255 can store a credit balance, wager information (e.g., an amount of a wager, a timestamp associated with a wager, information about the presence of an indication to participate in a bonus opportunity using the wager, a client device identifier of a client device that was used to place the wager, etc.). The player profile 255 can include one or more data structures for maintaining the information. The one or more data structures can include an index, values, sets, variables, vectors, or numbers. The player profile 255 can store information about a client device used to access the event processing system 205 such as an IP address, a MAC address, a GUID, an player profile name (e.g., the name of a user of the client device, etc.), device name, among others. In some implementations, a player profile 255 can be created by the event processing system 205 in response to a request transmitted by a client device or a broadcast receiver device 220. The player profile creation request can include any of the player profile information described herein. The player profile 255 can include indications of current or ongoing wagers. For example, the player profile 255 can include a list of identifiers of currently open wagers (e.g., the wager is placed, but the outcome is undetermined, etc.). As the outcome of each wager occurs, the player profile 255 can be updated to include the wager outcome. In some implementations, the event processing system 205 can update the player profile 255 with the wager outcomes.

The components of the event processing system 205 can monitor the content streams 260 or the live events (e.g., the live events). In some implementations, the event processing system 205 can identify the attributes 265 of the content streams 260. As described herein, when a player interacts or views a content stream 260 (such as TV shows, movies, a pay per view event, video on demand, sporting event, broadcast content, streaming service, content provided by applications executing on the broadcast receiver device 220, content provided by applications executing on the display device connected to the broadcast receiver device 220, etc.), the broadcast receiver device 220 (or the application executing thereon) can transmit attributes 265 to the event processing system 205 via one or more messages in a communication session. The attributes 265 can include, for example, a time of the view of the content stream 260, an interaction with the content stream 260, an identifier of a content stream 260, event related identifiers (e.g., name of a TV show, actor, athletic team, athlete), a type of the content stream 260 (e.g., movie or sporting event), an identifier of content items 270 displayed in association with the content stream 260, a different content stream 260 that the broadcast receiver device 220 navigated to or from in response to the display of the content stream 260, whether the content stream 260 was a live event or a recording, etc.).

Upon receiving the attributes 265, the event processing system 205 can store the attributes 265 of the content streams 260 in association with the player profile 255 that the player is using to access the functionality of the event processing system 205. In some implementations, the event processing system 205 can store the attributes 265 in association with one or more identifiers of live events (e.g., live sports, news shows, or any other live broadcast content the broadcast receiver device 220 was displaying). It should be understood that "historic content streams 260" can also include identifiers and attributes of content streams 260 that do not necessarily correspond to a "live" content stream 260, and can correspond to any type of content streams 260 (e.g., movies, shows, advertisements, events, etc.).

The database 225 can store or maintain attributes 265, for example, in one or more data structures. The attributes 265 can be a list of timestamp-associated identifiers of content streams 260 (e.g., broadcast content) accessed by the broadcast receiver device(s) 220 associated with (e.g., registered to, etc.) a player profile 255. In some implementations, the database 225 can store or maintain one or more attributes 265 of the content streams 260 associated with each of the one or more player profiles 255. For example, in some implementations, when a broadcast receiver device 220 accesses a content stream 260 (e.g., provided by the broadcast provider system 215, etc.), the application executing on the broadcast receiver device 220 can transmit the one or more attributes 265 of the accessed content stream 260 to the event processing system 205 in one or more content stream messages. In some implementations, the content stream messages can be transmitted periodically, for example, to indicate an amount of time (e.g., a duration, etc.) that a broadcast receiver device 220 has accessed a particular content stream 260. In some implementations, the content stream messages can include a time of the view of the content stream, an interaction with the content stream 260, an identifier of a content stream 260, event related identifiers (e.g., name of a TV show, actor, athletic team, athlete), a type of the content stream 260 (e.g., movie or sporting event), an identifier of content items 270 displayed in association with the content stream 260, a content item 270 or broadcast content that the broadcast receiver device 220 navigated to or from in response to the display of the content stream 260, whether the content stream 260 was a live event or a recording, etc.). In some implementations, the content stream messages can include a flag indicating whether a broadcast receiver device 220 has scheduled to receive (e.g., wager reminder) the content streams 260 identified in the content stream messages. The content stream messages can include a timestamp corresponding to a time that the broadcast receiver device 220 accessed the content streams 260. Any information in the content stream 260 messages can be stored by the event processing system 205 as an entry in the one or more data structures associated with the attributes 265.

In some implementations, upon receiving a content stream message, the event processing system 205 can identify the broadcast content being accessed by the broadcast receiver device 220 from the content stream message, and retrieve additional attributes 265 (e.g., from a third-party data provider, from an internal database, etc.) of the content streams 260. The additional attributes 265 can include, for example, identifiers of content items 270 displayed in the content streams 260 (e.g., a highlight reel, weather report, a listing of wagers, wager analysis, score report, etc.), and any information corresponding to the content streams 260 (e.g., identifiers of one or more teams displayed in the content stream 260, identifiers of one or more players displayed in the content stream 260, identifiers of one or more fantasy sports lineups displayed in the content stream 260, etc.). The additional information corresponding to the content streams 260 can include an event schedule, which can include an expected start time, an expected end time, or an expected duration of broadcast content corresponding to the content streams 260. The event processing system 205 can store the additional information corresponding to the content streams 260 as part of the corresponding entry associated with the attributes 265.

In some implementations, lists of current or upcoming broadcast content, and any corresponding live events, can be provided by the broadcast provider system 215 to the event processing system 205. The broadcast provider system 215 can provide the indications of broadcast content, for example, as part of a television-programming schedule. The television-programming schedule can provide an expected start time, an expected end time, or an expected duration of the live events corresponding to the broadcasts. In some implementations, the broadcast provider system 215 can provide one or more attributes 265 of the content streams 260 corresponding to the live events. The attributes 265 of the content streams 260 can include, for example, participants (e.g., players or teams) in the live events, a current score of the live event, or any other conditions of a live event (e.g., score for a quarter in a sporting event, points scored by a particular player in a sporting event, etc.). In some implementations, the broadcast provider system 215 can provide up-to-date attributes 265 of content streams 260 corresponding to one or more live events. In some implementations, the attributes 265 of content streams 260 corresponding to the live events can be retrieved from one or more external sources (not pictured). The event processing system 205 can query the broadcast provider system 215 for the up-to-date attributes 265. In some implementations, the event processing system 205 can request the up-to-date attributes 265 from the broadcast provider system 215. The request can include an identifier of the content streams 260 for which up-to-date attributes 265 are requested. In some implementations, the event processing system 205 can receive the up-to-date attributes 265 from the broadcast provider system 215.

In some implementations, the database 225 can store a data structure that includes an association between one or more event types, one or more wager types of wagers placed, and one or more attributes 265 of the content streams 260 with the content items 270. For example, as described in greater detail herein, the event processing system 205 can receive interactions from the broadcast receiver devices 220, which in some implementations can include requests to place wagers on current or upcoming events. When the wager interactions are received (e.g., via the broadcast provider system 215, or in some implementations from the broadcast receiver devices 220 directly, etc.), the event processing system 205 can store a data structure in association with the corresponding attributes 265 of the content streams 260 corresponding to the live event indicated in the wager request. For example, the attributes 265 associated with the wager request can be identifiers of one or more teams displayed in the content stream 260 or identifiers of one or more players displayed in the content stream 260. In some implementations, the data structure can identify an actionable object with which the player interacted or viewed, identifier(s) of the content stream 260, or other actionable object, identifiers of a type of action (e.g., record, navigate to different content streams 260, place a wager, etc.) performed by the player via the interaction, values corresponding to any input information (e.g., wager amounts, etc.), wager type (e.g., over/under, prop bet, etc.), or any other information relating to an interaction performed by a player at the broadcast receiver device 220.

The data structure can include, for example, an association with the player profile 255 used to request the wager, the type of event on which the wager was placed, and the identifier of the live event on which the wager was placed. The data structures can be stored as part of the player profile 255, and used in the operations of the event processing system 205 described herein. For example, the data structure can include information about a wager placed by a player while viewing a corresponding content stream 260 (e.g., one or more teams, players, odds, etc.), or information about a status of the wager. The additional information can include a timestamp corresponding to when the wager was placed, a type of wager (e.g., points, score, proposition, event, over/under, etc.), identifiers of one or more teams in the wager, identifiers of one or more players in the wager, or identifiers of one or more sports (e.g., basketball or soccer) in the wager.

In some implementations, the data structure can identify an actionable object with which the player interacted or viewed, identifier(s) of the content streams 260, or other actionable object, identifiers of a type of action (e.g., record, navigate to different content streams 260, place a wager, etc.) performed by the player via the interaction, values corresponding to any input information (e.g., wager amounts, etc.), wager type (e.g., over/under, prop bet, etc.), or any other information relating to an interaction performed by a player at the broadcast receiver device 220.

The database 225 can store or maintain one or more content items 270, for example, in one or more data structures. The content items 270 can include display instructions for the broadcast receiver devices 220 generated by the event processing system 205. In some implementations, the broadcast receiver devices 220 can forward the received instructions or generate new instructions based on the received instructions for the display device (e.g., smart TV) to display the content items 270. In some implementations, the display instructions are executable by the display device to cause display of the content items 270 on the display device. In some implementations, the content items 270 can be stored in association with a corresponding player profile 255 associated with a broadcast receiver device 220 to which the content item 270 was transmitted. The content items 270 can include any form of media, such as text, images, video, audio, or instructions to display images, video, or text, with broadcast content at a broadcast receiver device 220. The content items 270 can be stored in association with one or more tags, topics, or category identifiers that indicate the type of information provided by the content item 270. The content items 270 can each be stored in association with attributes 265 of the content streams 260, including information corresponding to events (e.g., sporting events, teams, score information, odds information for wagers, or other information relating to live events or wagering, etc.).

The content items 270 can have various presentation parameters. For example, images can include presentation parameters such as image height, image width, image format (e.g., BMP, PNG, JPEG, SVG, etc.), image bit-depth, and other image parameters. Presentation parameters for videos can include video duration, video codec, sound codec, video resolution (e.g., width, height, etc.), and closed captioning information (e.g., text content, etc.), among others. Presentation parameters for text can include font typeface, font size, text location, and other information. For example, a content item 270 can include instructions that cause the content item 270 to be presented on with broadcast content in connection with a second content item 270. In some implementations, the presentation parameters of the content item 270 can specify a relative position of the content item 270 when presented in the application executing at the broadcast receiver device 220. In some implementations, the content items 270 can include one or more fantasy sports contests, and can include parameters such as a sport category, a price parameter, a prize parameter, a registrant threshold, a registrant limit, a current registrant count, a day value, a time value, a duration value, a contest type, and an experience level.

The content items 270 can include instructions to present user interface elements (e.g., actionable objects, etc.). The user interface elements can include instructions that cause the broadcast receiver devices 220 to carry out one or more operations. For example, in some implementations, a content item 270 can include instructions that present a user interface element that, when interacted with, causes the broadcast receiver device 220 to navigate to different content streams 260 provided by the broadcast provider system 215. In some implementations, a content item 270 can include instructions that present a user interface element that, when interacted with, causes the broadcast receiver device 220 to schedule a recording (e.g., store content streams 260 locally in a memory of the broadcast receiver device, etc.) for content streams 260 provided by the broadcast provider system 215.

The content items 270 can be associated with the accessed content streams 260. In some implementations, the content items 270 associated with the content streams 260 can include information about a score (e.g., in the case of a sporting event, for one or more teams or event players, etc.), or information about a status of the event or wager. The content items 270 can include an event schedule, which can include an expected start time, an expected end time, or an expected duration of the content streams 260. The event processing system 205 can store the content items 270 in association with a content identifier corresponding to the content streams 260. The event processing system 205 can use the content identifier to look up content items 270 associated with particular content streams 260. In some implementations, the event processing system 205 can continuously or periodically retrieve up-to-date content items 270 for each live event. In some implementations, the event processing system 205 can generate the content items 270 based on the content streams 260 or the attributes of the content streams 260. For example, the event processing system 205 can generate content items 260 that include wagers associated with a content stream 260 based on updates, changes, or events associated with the content stream 260 (e.g., the score changes, a player is injured or ejected, a team is added or eliminated in a tournament, etc.).

In some implementations, a content item 270 can include instructions that present a user interface element that, when interacted with, causes the broadcast receiver device 220 to transmit a request to place a wager on a live event identified by the content item 270. The request to place the wager can include, for example, a wager amount and wager properties (e.g., type of wager, odds of wager, condition on which the wager was placed, etc.). Upon receiving the request to place the wager in response to an interaction with the content item 270, the event processing system 205 can store a record of the request as part of the attributes 265 in association with the player profile used to access the event processing system 205

Referring now to the operations of the event processing system 205, the content maintainer 230 can maintain a one or more content items 270 in the database 225. As described herein, each the content items 270 can be stored in association with corresponding content parameters, which can identify one or more properties of the content items 270 (e.g., identifiers of content streams 260 associated with the content items 270, identifiers of events associated with the content items 270, identifiers of event players, event teams, fantasy sports information, etc.). In some implementations, the content items 270 can be stored in association with one or more topics, tags, or categories, and can include identifiers of a type of actionable object in the content item 270, if present. In some implementations, a content item 270 may be associated with one or more attributes 265 or content streams 260 that can include one or more broadcasts. In some implementations, the content maintainer 230 can request content items 270 relating to current, historic, or upcoming events. For example, if the content maintainer 230 detects that an upcoming live event will be broadcast to one or more broadcast receiver devices 220 by the broadcast provider system 215, the content maintainer 230 can request content items 270 relating to the upcoming event from the one or more external sources. The received content items 270 can then be stored in association with an identifier of the upcoming event, and can subsequently be processed by other components of the event processing system 205 as described herein.

To maintain or store the content items, the content maintainer 230 can receive the content items 270, for example, from one or more external sources (not pictured) via the network 210. In some implementations, the content maintainer 230 can receive an update to one or more content items 270 that are stored in the database 225. In response to the update, the content maintainer 230 can replace the content item 270 to be updated with an updated content item 270 received in the update. In some implementations, external sources can transmit content in one or more content portions (e.g., images, videos, text, metadata, etc.), and the components of the event processing system 205 can generate the content items 270 using the content portions. In some implementations, and as described in greater detail herein, the components of the event processing system 205 can generate instructions that present user interface elements (e.g., actionable objects) with the content items 270. Likewise, in some implementations, the components of the event processing system 205 can generate one or more of the content items 270, and the content maintainer 230 can store the generated content items 270 in the database 225.

Upon receiving content items 270 from an external content source, the content maintainer 230 can store the received content items 270 in the database 225 in association with any content properties, parameters, content streams 260 and attributes 265 thereof, or other information related to the content items 270 received from the external content source. In some implementations, the stream identifier 235 can identify one or more attributes 265 of the content streams 260. As described herein, the event processing system 205 can maintain data structures that include identifiers of content streams 260 provided by the broadcast provider system 215 and accessed by the broadcast receiver devices 220. In addition, the event processing system 205 can identify one or more attributes 265 provided by a broadcast receiver device 220 while the broadcast receiver device 220 was presenting the content streams 260 with the broadcast of the live content. In some implementations, the player profile 255 to which the broadcast receiver device 220 is registered must include an "opt-in" option for the event processing system 205 to store a record of the content streams 260 (e.g., including broadcasts of live events, TV show, movie, a pay per view event, sporting event, broadcast content, etc.) accessed by the broadcast receiver device 220.

The stream identifier 235 can identify the content streams 260 accessed via one or more broadcast receiver devices 220. For example, when the broadcast receiver device 220 transmits attributes 265 of the content streams 260 provided to the broadcast receiver device 220 to the event processing system 205, the stream identifier 235 can identify the player profile 255 used to access the event processing system 205 via the broadcast receiver device 220. To do so, the stream identifier 235 can parse the attributes 265 as they are received from the broadcast receiver devices 220 to identify the content streams 260. The stream identifier 235 can query the attributes 265 in the database 225 to identify the content streams 260. For example, the stream identifier 235 can identify that the content streams 260 are associated with a TV show or a sporting event.

In some implementations, the stream identifier 235 can query the attributes 265 with a third party to retrieve additional information about the content streams 260. For example, the stream identifier 235 can query a third party to retrieve information about players, sports teams, actors, or venues associated with that the content streams 260. In some implementations, a content provider or classifier can access attributes 265 of content streams 260, and to update the attributes 265 of any content streams 260 accessed by the broadcast receiver device 220. In some implementations, a classification model can access the attributes 265 to update the attributes 265 to categorize the content streams 260. For example, the classification model can identify that that a content stream 260 relates to a soccer match. The classification model can update or generate the attributes 265 relating to the content stream 260 to indicate that the content stream 260 relates to a soccer match. In some implementations, subject matter experts (e.g., sports broadcasters) can train the classification model to identify or generate attributes 265 of the content stream 260. For example, the subject matter experts can train the classification model to generate attributes 265 relating to soccer matches upon that content streams 260 including display of a soccer field or 22 players on the field. The classification model may be a machine-learning model, such as a neural network or linear regression model, which is trained utilizing a supervised learning process over training data procured by subject matter experts.

In some implementations, the stream identifier 235 can receive an identifier of the broadcast receiver devices 220. Based on the identifier, the stream identifier 235 can determine the identifier of the player profile 255 with which the broadcast receiver device 220 is associated. Based on the player profile 255, the stream identifier 235 can use the identifier to perform a lookup operation in the database 225 to access the information of the identified player profile 255. The player profile 255 can include an option, which can be modified via messages transmitted to the event processing system 205 to modify a player profile 255, which indicates whether the event processing system 205 can store attributes 265 of broadcast content included in the content streams 260 accessed by the broadcast receiver device 220. If the player profile 255 associated with attributes 265 received by the stream identifier 235 indicates that the event processing system 205 is authorized to store attributes 265 of content streams 260 accessed by the broadcast receiver device 220, the stream identifier 235 can store the attributes 265 of the content streams 260 that were accessed by the broadcast receiver device 220.

In some implementations, the stream identifier 235 can receive identifiers associated with the display of the content streams 260. If the player profile 255 indicates that the event processing system 205 is authorized to store identifiers of the broadcast receiver device 220 and/or the display device, the stream identifier 235 can store the identifiers. To request and receive the identifiers, the stream identifier 235 can establish inter-process communication (IPC) with the broadcast receiver device 220 and/or the display device. For example, the stream identifier 235 can receive identifiers that identify interactions with the content streams 260 displayed by the broadcast receiver device 220. The identifiers of the interactions can include, for example, interaction coordinates, an interaction type (e.g., click, swipe, scroll, tap, etc.), and an indication of an actionable object with which the interaction occurred. The identifiers can identify the application executing on or in association with the broadcast receiver device 220. For example, the identifiers can identify the application executed by the smart TV to display the content streams 260. In some implementations, the identifiers can include other applications and activities associated therewith on the display device. For example, the smart TV can indicate the other applications being executed by the smart TV, such as sports channels or games. The stream identifier 235 can store identifiers of the other applications into the player profile 255.

In some implementations, the stream identifier 235 can receive a request from a client device (e.g., client device 102 described herein in conjunction with FIGS. 1A-1D) or a broadcast receiver device 220 to modify or authorize access to the player profile 255. The request to modify or authorize access to the player profile 255 can include, for example, an identifier of the player profile 255 to modify and updated information to store as part of the player profile 255. In response to the request, the stream identifier 235 can update the player profile 255 with the updated information in the request, and transmit a notification to the requesting computing device that indicates the player profile 255 was updated.

In some implementations, the request to modify the player profile 255 can include a request to authorize access to the attributes 265 of the content streams 260 accessed by the broadcast receiver device 220 associated with (e.g., registered to, etc.) the player profile 255. In some implementations, in response to the request to authorize access to the attributes 265 of the content streams 260, the stream identifier 235 can identify the content streams 260 accessed by the broadcast receiver devices 220. In response to the request to modify or authorize access to the player profile 255, the stream identifier 235 can enable the option to access and update the player profile 255. In some implementations, a content provider or classifier can update the player profile with tags. The tags can relate to preferences of the player corresponding to the player profile 255. For example, the tags can indicate a preferred type of wagers (e.g., proposition bets) for the player profile 255. The event processing system 205 can receive the updates.

In some implementations, the broadcast receiver device 220 (or the application executing on the broadcast receiver device 220) can transmit one or more requests for content items 270, notifications, or alerts with the content streams 260. The request can be transmitted, for example, in response to navigating among the content streams 260 displayed by the broadcast receiver device 220. For example, when a player uses an input device to select among content streams 260 offered or provided by the broadcast provider system 215 to display at a display device, the broadcast receiver device 220 can transmit a request for additional content to the event processing system 205 that identifies the displayed content streams 260. In some implementations, the request for additional content items 270 can include an indication of the player profile 255 associated with the broadcast receiver device 220.

The stream identifier 235 can generate or update a streaming profile associated with or included in the player profile 255 corresponding to the broadcast receiver device 220 or display device (e.g., smart TV). The stream identifier 235 can identify any content streams 260 accessed by the broadcast receiver devices 220 associated with the player profile 255. The streaming profile can identify a history or pattern of access to the content streams 260 by the broadcast receiver device 220. For example, the streaming profile can identify that a particular broadcast receiver device 220 receives news TV shows in the mornings and sports matches in the evenings.

The stream identifier 235 can generate the streaming profile based on the attributes 265 of the content streams 260 accessed by the broadcast receiver device 220 associated with the player profile 255. The stream identifier 235 can associate the attributes 265 with the streaming profile corresponding to the broadcast receiver device 220 receiving the content streams 260. The broadcast receiver device 220 may also provide indications of content streams 260 as they are accessed by the broadcast receiver device 220. The stream identifier 235 can update the streaming profile with the attributes 265 of the content streams 260 accessed by the broadcast receiver device 220.

The arrangement determiner 240 can determine to provide content items 270 to the broadcast receiver devices 220 based on similarities (e.g., tags, categories, common players, common teams, common event types, etc.) between the content items 270 and player profiles 255 corresponding to the broadcast receiver devices 220. In some implementations, the arrangement determiner 240 can determine to provide content items 270 to a broadcast receiver device 220 upon determining that the broadcast receiver device 220 is displaying content streams 260 that satisfy one or more criteria (e.g., the content streams 260 correspond to a live event associated with the content items 270, the content streams 260 are a live event type associated with the content items 270, the content streams 260 are related to one or more fantasy sports lineups associated with the content items 270, etc.).

The arrangement determiner 240 can determine, generate, or select an arrangement of one or more content items 270 to provide the broadcast receiver device 220. The arrangement determiner 240 can determine the arrangement, for example, based on one or more attributes 265 of the content streams 260 that were previously accessed by the broadcast receiver device 220 associated with a player profile 255. In some implementations, the arrangement determiner 240 can determine the arrangement based on the attributes 265 of the content streams 260 identified by the stream identifier 235. In some implementations, the arrangement determiner 240 can determine the arrangement based on the identifiers of the applications associated with the broadcast receiver device 220, such as applications of content providers executing on a display device (e.g., smart TV). In some implementations, the arrangement determiner 240 can determine the arrangement based on the streaming profile associated with or included in the player profile 255. Because on the attributes 265 provided by the broadcast receiver devices 220 and identified by the stream identifier 235, the arrangement determiner 240 can identify the types of content items 270 (e.g., types of wagers for a soccer match) relevant to the content streams 260 (e.g., soccer match). Therefore, in some implementations, the arrangement determiner 240 can select the one or more content items 270 to provide to the broadcast receiver device 220 based on the attributes 265 of the identified content streams 260.

In some implementations, the arrangement determiner 240 can rank (and thereby arrange) the selected content items 270 based on one or more attributes 265 of a content stream 260 currently being presented at the broadcast receiver device 220 or the display device (e.g., smart TV) that requested the content items 270 to display with the content streams 260 (e.g., broadcast content). For example, the arrangement determiner 240 can arrange the content items 270 to include wagers associated with a content stream 260 based on updates, changes, or events associated with the content stream 260 (e.g., the score changes, a player is injured or ejected, a team is added or eliminated in a tournament, etc.). As described herein, the broadcast receiver device 220 can provide, to the event processing system 205, an indication of content streams 260 being presented at a display device associated with the broadcast receiver device 220. Upon receiving the indication, the arrangement determiner 240 can access the additional information relating to the content streams 260, as described herein. Recall that the additional information can be retrieved, for example, from one or more external sources or from an internal database 225, that maintains information and attributes of events depicted in content streams 260. The arrangement determiner 240 can then determine a match score between each selected content item 270 and the attributes 265 of the content streams 260 being presented at the broadcast receiver device 220. The match score calculated for each of the selected content items 270 can be the rank for that selected content item 270. The arrangement determiner 240 can then determine the arrangement for the selected content items 270 based on the ranking, as above.

In some implementations, the arrangement determiner 240 can determine a match score for one or more candidate content items 270. The candidate content items 270 can be selected, for example, as content items 270 corresponding to broadcasts of current or upcoming live events. In some implementations, the candidate content items 270 can be content items 270 that are associated with (e.g., as a category or tag, etc.) a broadcast of a current or upcoming event. For example, the arrangement determiner 240 can rank (and thereby arrange) the selected content items 270 (e.g., wagers) based on the content streams 260 that were previously accessed by the broadcast receiver device 220. For example, when the player requests to place a wager, the wager can be recorded as an open or otherwise unresolved wager. Because wagers are often placed on uncertain events, where a player can risk a certain amount of money for an uncertain large reward, the odds of any particular outcome of a wager can change according to the conditions of the uncertain events. These odds values, or other real-time wager information, can be adjusted based on a variety of factors, including a change in a likelihood that a particular outcome will occur, or a change in an amount of credits wagered by all players participating in the wagers on any particular outcome, among others.

From the candidate content items 270, the arrangement determiner 240 can further select one or more content items 270 to present at the broadcast receiver device 220, and determine an arrangement for the selected content items 270. In some implementations, to select the content items 270 to present at the broadcast receiver device 220, the arrangement determiner 240 can determine a match score between attributes of each of the candidate content items 270 and the attributes 265 of the content streams 260 identified by the stream identifier 235. To determine a match score, the arrangement determiner 240 can determine a number of common attributes 265 (e.g., tags, categories, common players, common teams, common event types, etc.) between the content item 270 and each content stream 260 associated with a player profile 255. In some implementations, wagers, notifications, alerts, and other interactive content items 270 displayed with content streams (e.g., live broadcast content) can be selected or generated by the arrangement determiner 240 based on the player profile 255. This additional content can be selected by the arrangement determiner 240 based on various attributes of a player profile 255 associated with a broadcast receiver device 220, including wager opportunities based on current in game events (e.g., elapsed time, player statistics, team statistics, game statistics, etc.), historical activity data of the player profile 255, or historical live events accessed or interacted with by the player profile 255, among others. The aggregate of the total number of matching attributes between the content item 270 and the attributes 265 of each content stream 260 can be the match score. However, it should be understood that an aggregate is just an example, and other calculations may be performed to calculate a match score between the attributes 265 of each content stream 260 and the content items 270.

Once the match score has been calculated for each candidate content item 270, the arrangement determiner 240 can select the candidate content items 270 to present at the broadcast receiver device 220 by selecting a predetermined number of candidate content items 270. If ties occur, the arrangement determiner 240 can select the predetermined number of content items 270 according to a tie breaking policy (e.g., alphabetical order first wins, reverse alphabetical order first wins, any other tie breaking policy, etc.). In some implementations, the arrangement determiner 240 can calculate the match score as between the attributes 265 of each candidate content item 270 and the attributes 265 of previously accessed content streams 260 associated with a player profile 255. In some implementations, the match score calculated based on the player profile 255 can be added to the match score calculated based on the content streams 260 identified by the stream identifier 235 to create an aggregate match score (e.g., such that content items 270 are selected both based on aspects of the player profile 255 and aspects of historically accessed content streams 260 associated with the player profile 255). The arrangement determiner 240 can then select the content items 270 to present at the broadcast receiver device 220 as above, but using the aggregate match score.

Once the content items 270 have been selected from the candidate content items 270, the arrangement determiner 240 can use the attributes 265 of the content streams 260 to determine an arrangement for the selected content items 270. The arrangement of the content items 270 can identify one or more positions in an application interface that each content item 270 will be displayed. For example, the content items 270 may be provided in a sorted list of content items 270 according to a ranking. Content items 270 having a larger ranking can be positioned higher in the list than content items 270 with a lower ranking. In some implementations, the ranking can indicate a relative size of the content items 270 (e.g., where content items 270 having a higher ranking are presented at a larger size or a larger prominence, etc.). Likewise, it should be understood that other arrangements are possible, where a respective score or ranking designated to one or more of the selected content items 270 can be used to specify the position or size of the content item 270 when displayed at the broadcast receiver device 220.

The arrangement determiner 240 can determine an arrangement for the selected content items 270 based on, for example, the respective player profile 255. If the player profile 255 corresponding to the broadcast receiver device 220 indicates a large number of interactions with a particular type of content items 270 (e.g., winter sports) relative to other types of content items 270 (e.g., tennis), the arrangement determiner 240 can rank content items 270 that include tags, category associations, or other information associated with the particular type of content items 270 as higher than other content items 270 associated with the other types. In some implementations, the arrangement determiner 240 can include artificial intelligence models (e.g., machine learning models, neural network, decision trees, ruled-based lookup table, etc.) that cause the arrangement determiner 240 to assign a rank to each of the content items 270 based on their types, the attributes of the corresponding player profile 255, and the attributes 265 of the content streams 260.

The arrangement determiner 240 can train one or more artificial intelligence models that generate a corresponding rank for each of the selected content items 270. To do so, the arrangement determiner 240 can apply sets of labeled training data, which can include sets of content items 270, attributes of player profiles 255, and attributes 265 of historic content streams 260 associated with one or more player profiles 255.

The training data can be labeled with ground-truth values corresponding to the ranks of the content items 270 in the training data. In some implementations, a classification model or subject matter experts (e.g., content producers or wager regulators) can assign ranks to the content items 270. In some implementations, the classification model can classify the content items 270. For example, the classification model can identify that that content items 260 relate to wagers for a soccer match based on texts or logos (e.g., of soccer teams) included in the content items 260. In some implementations, subject matter experts (e.g., sports broadcasters or wager regulators) can train the classification model to identify or classify the content items 270. In some implementations, the subject matter experts can rank the content items 270 based on players, teams, actionable objects, or media content included in the content items 270. For example, content items 270 with an actionable object to place a wager can be ranked higher than content items 270 that advertise a TV show.

The arrangement determiner 240 can train the model using one or more supervised learning techniques, such as back-propagation. In some implementations, the arrangement determiner 240 can train the artificial intelligence model(s) using unsupervised learning techniques, or semi-supervised learning techniques. Once the model is trained, the arrangement determiner 240 can use the artificial intelligence model to generate rankings for the selected content items 270 based on the player profiles 255 or the attributes 265 of the content streams 260 previously accessed by a player profile 255.

In some implementations, the arrangement determiner 240 can determine the arrangement of the content items 270 based on a known layout of the content streams 260. Certain content streams 260, such as for example, content streams 260 for sporting events on particular television channels, often include a regular layout, with a portion of the broadcast content dedicated toward gameplay footage, and other portions of the content streams 260 dedicated to score information, team information, player information, and other information. Other types of content streams 260 have similar layout schemes. Often, in such layout schemes, some regions of the content streams 260 are left unused or otherwise do not include any interesting information. When the event processing system 205 receives an indication that a broadcast receiver device 220 is displaying content streams 260, the additional information retrieved relating to the content streams 260 can include indications of regions of the content streams 260 that are "uninteresting." In some implementations, the arrangement determiner 240 can determine the arrangement of the content items 270 to fill these "unused" or "uninteresting" spaces in content streams 260, such that the selected content items 270 can be presented on top of, or directly with the content streams 260 without blocking or occluding otherwise important aspects of the content streams 260. To do so, the arrangement determiner 240 can determine positions and sizes for the selected content items 270 such that they fill one or more portions of the content streams 260 that are "unused." For example, in some implementations, a list of the selected content items 270 can be displayed in a region of the display that is designated as "unused" or "uninteresting," and the selected content items 270 can be displayed in the list according to their ranking.

The instructions generator 245 can generate display instructions for the broadcast receiver device 220 based on the arrangement of the selected content items 270. The display instructions can include, for example, instructions to display the content items 270 as part of a notification (e.g., an alert or a popup overlaid over the broadcast of the live event displayed at the broadcast receiver device 220), and/or formatting instructions to position each of the content items 270 according to the arrangement (e.g., absolute or relative positions of the content items 270, an order of the content items 270 in a list, etc.). In addition, the instructions can include the selected content items 270 and an indication that the selected content items 270 are to be presented with content streams 260 displayed at the broadcast receiver device 220. As described herein, the broadcast receiver devices 220 can receive content streams 260 from a broadcast provider system 215, for example, via a proprietary broadcast network. In conventional broadcast systems, broadcast receiver devices 220 cannot display additional content items 270 according to customized arrangements or properties or attributes 265 of the displayed content streams 260. The system 200 is an improvement over these conventional systems because the event processing system 205 can generate instructions that cause an application executing on the broadcast receiver device 220 (or display device such as a smart TV) to display selected content items 270 according to a customized arrangement at the same time as content streams 260.

Some examples of the event processing system 205 managing the transmission of content items 270 in content streams 260 are depicted in FIGS. 3A, 3B, 3C, and 3D. Referring briefly, now to FIG. 3A, depicted is an environment 300A of the event processing system 205 providing content streams 260 to the broadcast receiver devices 220 for presentation by the displays 305. The broadcast receiver device 220A and the broadcast receiver device 220B are each communicatively coupled a display 305A and a display 305B for displaying the content items 270 and the content streams 260. The event processing system 205 can provide a content stream 260A to the broadcast receiver device 220A, and a content stream 260B to the broadcast receiver device 220B. The content stream 260A shown here is media content related to downhill skiing (e.g., downhill skiing related videos, information about a downhill skiing, advertisement for downhill skiing, etc.). However, it should be understood that the content stream 260A could be any type of content, and need not necessarily be downhill skiing content. The content stream 260B shown here is media content related to tennis (e.g., tennis tournaments, tennis highlights, advertisement for tennis rackets, etc.). However, it should be understood that the content stream 260B could be any type of content, and need not necessarily be tennis content.

An application executing on the broadcast receiver device 220A or the display 305A (e.g., the display 305A is a smart TV) can cause the display 305A to display the content stream 260A provided by the event processing system 205, and an application executing on the broadcast receiver device 220B can cause the display 305B to display the content stream 260B provided by the event processing system 205. The application interface can receive or detect interactions with the content streams 260. The player can use the input devices (e.g., a remote, a gamepad, a controller, a keyboard, a mouse, a touchscreen, etc.) to interact with the content streams 260. When actuated (e.g., interacted with, etc.) the application executing on the broadcast receiver device 220 can transmit a request to change or request the content stream 260 to the event processing system 205, as described herein. For example, when actuated (e.g., interacted with, etc.) the application executing on the broadcast receiver device 220A can transmit, to the event processing system 205, a request to show content streams 260 relating to weather patterns at downhill ski resorts. In another example, when actuated (e.g., interacted with, etc.) the application executing on the broadcast receiver device 220B can transmit, to the event processing system 205, a request to view content streams 260 relating to tennis match highlights. In another example, the request can be to view a TV show. In some implementations, when actuated (e.g., interacted with, etc.) the application executing on the broadcast receiver devices 220 can transmit the request to the broadcast provider system 215 or other media sources. The application can transmit information about the request to the event processing system 205. When the request is received by the event processing system 205, the event processing system 205 can identify the attributes 265 of the content streams 260 requested by the broadcast receiver device 220. The event processing system can associate the attributes 265 with the player profile 255 associated with the broadcast receiver device 220.

FIG. 3B shows a similar environment 300B of the event processing system 205 providing content streams 260 to the broadcast receiver devices 220 for presentation by the displays 305. The event processing system 205 can provide a content stream 260C to the broadcast receiver device 220A, and a content stream 260D to the broadcast receiver device 220B. The content stream 260C shown here is media content relating to ice-skating (e.g., ice-skating related news videos, information about an ice skater, advertisement for ice-skating shoes, etc.). However, it should be understood that the content stream 260C could include any type of media content, and need not necessarily be ice-skating content. The content stream 260D shown here is media content relating to racquetball (e.g., racquetball documentaries, information about a racquetball tournament, advertisement for racquetball lessons, etc.). However, it should be understood that the content stream 260D could include any type of media content, and need not necessarily be racquetball content.

An application executing on the broadcast receiver device 220A or the display 305A (e.g., the display 305A is a smart TV) can cause the display 305A to display the content stream 260C provided by the event processing system 205, and an application executing on the broadcast receiver device 220B can cause the display 305B to display the content stream 260D provided by the event processing system 205. When actuated (e.g., interacted with, etc.) the application executing on the broadcast receiver device 220 can transmit a request to change or request the content stream 260 to the event processing system 205, as described herein. For example, when actuated (e.g., interacted with, etc.) the application executing on the broadcast receiver device 220A can transmit, to the event processing system 205, a request to view content streams 260 relating to ice skating tournaments. In another example, when actuated (e.g., interacted with, etc.) the application executing on the broadcast receiver device 220B can transmit, to the event processing system 205, a request to view an instructional video about racquetball. In some implementations, when actuated (e.g., interacted with, etc.) the application executing on the broadcast receiver devices 220 can transmit the request to the broadcast provider system 215 or other media sources. The application can transmit information about the request to the event processing system 205. When the request is received by the event processing system 205, the event processing system 205 can identify the attributes 265 of the content streams 260 requested by the broadcast receiver device 220. The event processing system 205 can associate the attributes 265 with the player profile 255 corresponding to the broadcast receiver device 220.

FIG. 3C shows a similar environment 300C of the event processing system 205 providing content streams 260 to the broadcast receiver devices 220 for presentation by the displays 305. The event processing system 205 can provide a content stream 260E to the broadcast receiver device 220A, and a content stream 260F to the broadcast receiver device 220B. The content stream 260E shown here can include media content related to cross-country skiing (e.g., cross-country skiing related wagers, information about a cross-country skier, information about local cross-country trails, etc.). However, it should be understood that the content item 270E could be any type of content, and need not necessarily be cross-country skiing content. The content stream 260F shown here can include media content related to golf (e.g., golf related wagers, information about a golf player, advertisement for golf tournament, etc.). However, it should be understood that the content item 270F could be any type of content, and need not necessarily be golf content.

An application executing on the broadcast receiver device 220A or the display 305A (e.g., the display 305A is a smart TV) can cause the display 305A to display the content stream 260E provided by the event processing system 205, and an application executing on the broadcast receiver device 220B can cause the display 305B to display the content stream 260F provided by the event processing system 205. When actuated (e.g., interacted with, etc.) the application executing on the broadcast receiver device 220 can transmit a request to change or request the content stream 260 to the event processing system 205, as described herein. For example, when actuated (e.g., interacted with, etc.) the application executing on the broadcast receiver device 220A can transmit, to the event processing system 205, a request to show content streams 260 relating to cross-country skiing. In another example, when actuated (e.g., interacted with, etc.) the application executing on the broadcast receiver device 220B can transmit, to the event processing system 205, a request to view content streams 260 relating to golf tournaments. In some implementations, when actuated (e.g., interacted with, etc.) the application executing on the broadcast receiver devices 220 can transmit the request to the broadcast provider system 215 or other media sources. The application can transmit information about the request to the event processing system 205. When the request is received by the event processing system 205, the event processing system 205 can identify the attributes 265 of the content streams 260 requested by the broadcast receiver device 220. The event processing system 205 can associate the attributes 265 with the player profile 255 corresponding to the broadcast receiver device 220.

Figure 3D:
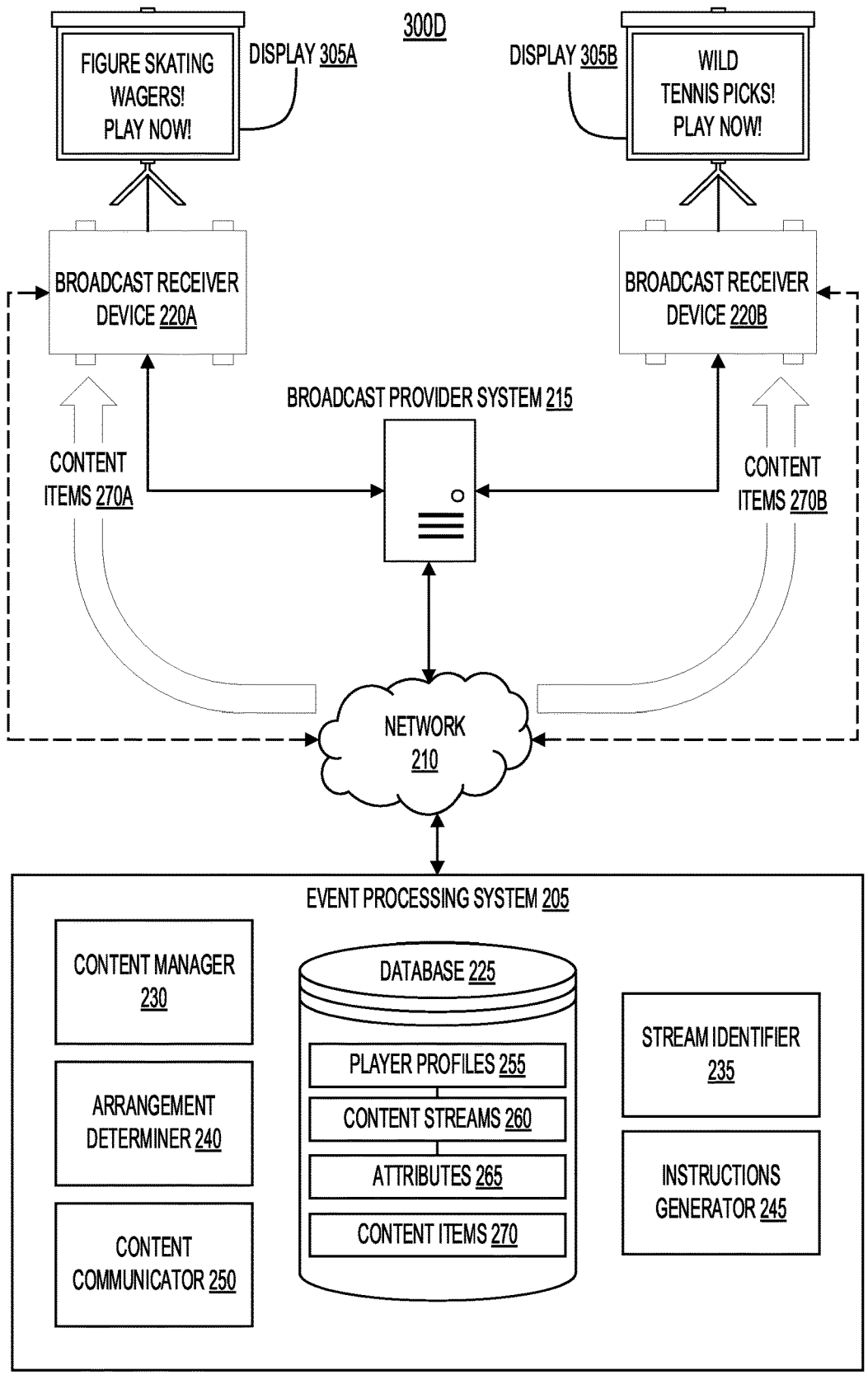

FIG. 3D shows an environment 300D of the event processing system 205 providing content items 270 to the broadcast receiver devices 220 for presentation by the displays 305. Based on the attributes of the content streams 260 identified by the stream identifier 235, the arrangement determiner 240 can determine the arrangement of content items 270 to transmit to each broadcast receiver device 220. For example, the arrangement determiner 240 can determine that the content streams 260A, 260C, 260E previously accessed by the broadcast receiver device 220A relate to winter sports. Based on the attributes 265 of the previously accessed content streams 260, the arrangement determiner 240 can select to a content item 270A to transmit to the broadcast receiver device 220, which as shown is content relating to figure skating wagers. However, it should be understood that the content item 270A could be any type of content, and need not necessarily be content related to winter sports. In another example, the arrangement determiner 240 can determine that the content streams 260B, 260D, 260F provided to the broadcast receiver device 220B relate to sports played with a ball (e.g., soccer, basketball, baseball, etc.). Based on the attributes 265 of the content streams 265 previously accessed by the broadcast receiver device 220B, the arrangement determiner 240 can select a content item 270B to transmit to the broadcast receiver device 220B, which as shown is content relating to wager opportunities for current or upcoming tennis games. However, it should be understood that the content item 270B could be any type of content, and need not necessarily be content related to ball sports.

Some examples of a display showing notifications, alerts, or other content items 270 being displayed in connection with content streams 260 are depicted in FIGS. 4A, 4B, and 4C. The content items 270 can be displayed based on the streaming profiles or player profiles 255 corresponding to the broadcast receiver device 220. In some implementations, the display can be the display device (e.g., smart TV) executing the application. In some implementations, the content items 270 can be displayed based on the streaming profiles or player profiles 255 associated with the display device.

Referring briefly now to FIG. 4A, depicted is a display 400A associated with or communicatively coupled to a broadcast receiver device 220 (not pictured here). As shown, a portion of the display 400A is dedicated to the broadcast content 410A, which here is shown as a basketball game. The broadcast content 410A (e.g., basketball game) can be an example of a content stream 260. However, it should be understood that the broadcast content 410A could be any type of broadcast content, and need not necessarily be a basketball game.

As shown in the left-hand pane of the display 400A, an application executing on the broadcast receiver device 220 or the display 400A is displaying an application interface 405A, which includes the selected content items 270 provided by the event processing system 205. The content items 270 are displayed in the application interface 405A as a list of content items 270, with the first few content items 270 in the list corresponding to wagers a player can place via the application interface. The wagers can relate to the broadcast content 410A (e.g., basketball game).

As described herein, the event processing system 205 can select the content items 270 corresponding to the basketball game (e.g., broadcast content 410A or content streams 260) for display in the application interface 405A. In some implementations, when actuated (e.g., interacted with, etc.) the application executing on the display 400A on the broadcast receiver device 220 can transmit a request to place a wager indicated in the content item 270 to the event processing system 205, as described herein. In some implementations, the application executing on the display 400C can transmit the request to the event processing system 205 via the broadcast receiver device 220. The last item in the list is a content item 270 that, if actuated (e.g., selected, interacted with, etc.), causes the broadcast receiver device 220 to navigate, or change channels to, other broadcast content provided by the broadcast provider system 215. Although not depicted here, such content items 270 can identify both the channel to which the broadcast receiver would navigate or a name of the live event corresponding to the other content broadcasts.

FIG. 4B shows a similar display 400B associated with or communicatively coupled to a broadcast receiver device 220 (not pictured here). As shown, a portion of the display 400B is dedicated to the broadcast content 410B, which here is shown as a football game. The broadcast content 410B (e.g., football game) can be an example of a content stream 260. However, it should be understood that the broadcast content 410B could be any type of content streams 260, and need not necessarily be a football game.

As shown in the left-hand pane of the display 400B, an application executing on the broadcast receiver device 220 or the display 400B is displaying an application interface 405B, which includes the selected content items 270 provided by the event processing system 205. The content items 270 are displayed in the application interface 405B as a list of content items, which are related to the football game displayed as the broadcast content 410B. The first and last content items 270 in the list correspond to wagers a player can place via the application interface. The wagers can relate to the broadcast content 410B (e.g., football game).

As described herein, the event processing system 205 can select the content items 270 corresponding to the football game (e.g., broadcast content 410B or content streams 260) to for display in the application interface 405B. In some implementations, when actuated (e.g., interacted with, etc.) the application executing on the broadcast receiver device 220 or the display 400C can transmit a request to place a wager indicated in the content item 270 to the event processing system 205, as described herein. In some implementations, the application executing on the display 400C can transmit the request to the event processing system 205 via the broadcast receiver device 220. The middle content item 270 in the list is a content item 270 that, if actuated (e.g., selected, interacted with, etc.), causes the broadcast receiver device 220 to present an additional user interface (not pictured) with content items 270 for allowing a user to modify or create a new fantasy line up on their television.

The additional user interface may have a different position or size than the application interface 405B. In doing so, the broadcast receiver device 220 or the can transmit a request to the event processing system 205 for content streams 260 relating to fantasy lineup information for the player profile 255 associated with (e.g., registered to) the broadcast receiver device 220. In response, the event processing system 205 can transmit any active fantasy lineups of the player profile 255 to the broadcast receiver device 220, which can be presented in additional user interface. The player can use the input devices (e.g., a remote, a gamepad, a controller, a keyboard, a mouse, a touchscreen, etc.) to configure fantasy sports lineups of in the additional user interface, which the broadcast receiver device 220 can transmit to the event processing system 205. When received by the event processing system 205, the event processing system 205 can store the fantasy sports lineups in association with, or as part of, the corresponding player profile 255. Although not depicted here, such content items 270 can identify any information relating to fantasy sports lineups for current or upcoming live events.

Referring briefly now to FIG. 4C, depicted is a display 400C associated with or communicatively coupled to a broadcast receiver device 220 (not pictured here). As shown, a portion of the display 400C is dedicated to the broadcast content 410C, which here is shown as a baseball game. The broadcast content 410C (e.g., baseball game) can be an example of a content stream 260. However, it should be understood that the broadcast content 410C could be any type of content streams 260, and need not necessarily be a basketball game.

As shown, the application overlay 405C includes the selected content items 270 provided by the event processing system 205. As shown, the application overlay 405C overlays a portion of the broadcast content 410C that is determined by the event processing system 205 to be uninteresting or otherwise unused. In some implementations, the application overlay 405C (or any other application interfaces described herein, etc.) can be semi-transparent, such that portions of the broadcast content 410C are still partially visible when the application overlay 405C is displayed by the application executing on the broadcast receiver device 220 or the display 400C. In some implementations, a player can control the positon or size of the application interfaces described herein (e.g., including the application overlay 405C, etc.) via one or more input devices (e.g., a remote, a controller, a gamepad, a keyboard, a mouse, etc.). In the application overlay 405C, the content items 270 are displayed as a list of content items 270, with the first content items 270 in the list corresponding to wagers a player can place via the application overlay 405C. The wagers can relate to the broadcast content 410C (e.g., baseball game).

As described herein, the event processing system 205 can select the content items 270 corresponding to the baseball game (e.g., broadcast content 410C or content streams 260) for display in the application interface 405C. In some implementations, when actuated (e.g., interacted with, etc.) the application executing on the broadcast receiver device 220 or the display 400C can transmit a request to place a wager indicated in the content item 270 to the event processing system 205, as described herein. In some implementations, the application executing on the display 400C can transmit the request to the event processing system 205 via the broadcast receiver device 220. The last item in the list is a content item 270 that, if actuated (e.g., selected, interacted with, etc.), causes the broadcast receiver device 220 to place a wager on another live event (e.g., a live event different from what is depicted in the broadcast content 410C, etc.). Similarly, when actuated, the broadcast receiver device can transmit a request to place a wager indicated in the content item 270 to the event processing system 205, as described herein. Although not depicted here, such content items 270 can identify both the channel (e.g., the cable channel, etc.) corresponding to the content stream 260 or a name of the live event corresponding to the other content broadcasts.

Referring back now to FIG. 2, the instructions generated by the instructions generator 245 can be received, for example, by the broadcast provider system 215, and can include indications or identifiers of the broadcast receiver devices 220 to which the display instructions are directed. The instructions generator 245 can generate display instructions, which can be formatting instructions or other types of executable or computer-readable instructions that cause the broadcast receiver device 220 or display device to display any of the application interfaces depicted in FIG. 4A, 4B, or 4C, among other display features described herein. The display instructions can include the content items 270, and one or more scripts that cause the content items 270 to be or to include actionable objects, as described herein. In some implementations, to generate the display instructions, the instructions generator 245 can utilize one or more templates corresponding to a type of content item 270 (e.g., a content item 270 that causes the broadcast receiver device 220 or display device to place a wager on a live event, a content item 270 that causes the broadcast receiver device 220 or display device to navigate to another broadcast, a content item 270 that causes the broadcast receiver device 220 or display device to create or modify a fantasy sports lineup, etc.). To generate the instructions, the instructions generator 245 can populate predetermined portions of the template with one or more of the selected content items 270. In some implementations, the instructions generator 245 can generate the instructions based on a determined type of broadcast receiver device 220 or display device. For example, a cable box may require a different type of instructions than a set top box, or a cable box that receives a satellite signal via a satellite dish. To accommodate for different types of broadcast receiver devices 220 or display devices, the instructions generator 245 can maintain sets of templates both for each content item type (e.g., types of interactions, types of content items 270 or media content, etc.) and for each type of broadcast receiver device 220 or display devices.

Once generated, the content communicator 250 can transmit the display instructions to the broadcast receiver device 220 or display device, causing the broadcast receiver device 220 to display the content items 270 according to the arrangement with the broadcast of the live event, similar to the displays in FIG. 4A, 4B, or 4C. In some implementations, the content communicator 250 can transmit the display instructions to the broadcast provider system 215. The instructions can include, for example, indications of the one or more broadcast receiver devices 220 or display devices that are to receive the display instructions. Upon receiving the display instructions from the content communicator 250, the broadcast provider system 215 can identify the one or more destination broadcast receiver devices 220 or display devices as indicated in the instructions, and transmit the display instructions to each of the destination broadcast receiver devices 220 or display devices. The application executing on the broadcast receiver device 220 or display devices can receive the display instructions and identify the arrangement of the content items 270 to display with the content streams 260 (e.g., live broadcast content). The application can then render the content items in one or more application interfaces or overlays, such as those depicted in FIG. 4A, 4B, or 4C. As described herein, the broadcast receiver device 220 or display device can receive interactions from a player via one or more input devices, allowing for interaction with one or more actionable objects depicted as part of the content items 270. Upon detecting an interaction, the broadcast receiver device 220 or display device can parse or execute the display instructions for the selected content item 270 to carry out the designated action (e.g., transmit a request to place a wager; navigate to other content items 270 or content streams 260; update a fantasy sports lineup, etc.). It should be understood that any other functionality as described herein could be carried out by the broadcast receiver device 220 or display device via the application or the display instructions.

Figure 5:
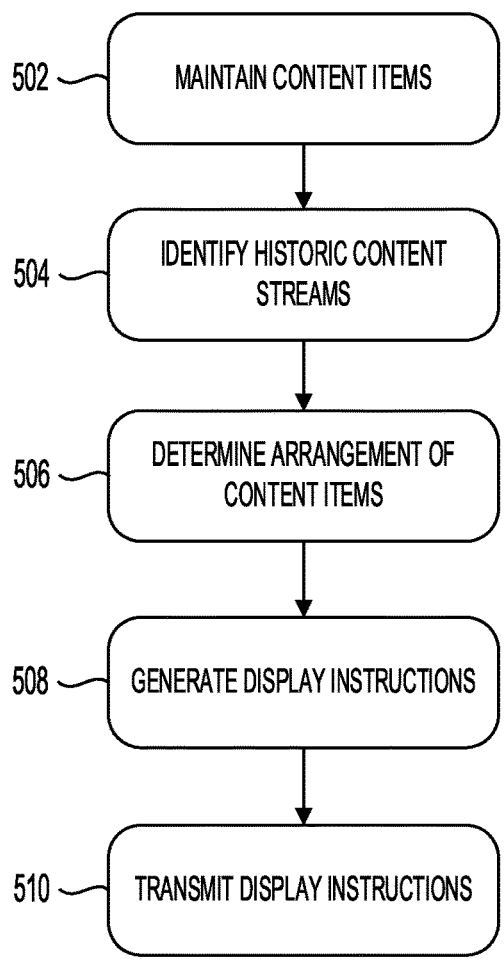
FIG. 5 illustrates an example flow diagram of a method for generating notification interfaces based on media broadcast access events, in accordance with one or more implementation.

Referring now to FIG. 5, depicted is an illustrative flow diagram of a method 500 for generating notification interfaces based on media broadcast access events. The method 500 can be executed, performed, or otherwise carried out by the event processing system 205, the computer system 100 described herein in conjunction with FIG. 1A-1D, or any other computing devices described herein. In brief overview of the method 500, the event processing system (e.g., the event processing system 205, etc.) can maintain content items (e.g., the content items 270) corresponding to a live event (STEP 502), identify historic content streams (e.g., the content streams 260) accessed by a broadcast receiver device (e.g., the broadcast receiver device 220, etc.) (STEP 504), determine an arrangement based on attributes of the historic live events (STEP 506), generate instructions to display the arrangement of content items with the live event at a broadcast receiver device (STEP 508), and transmit the instructions to display the arrangement of content items with the live event at the broadcast receiver device (STEP 510).

In further detail of the method 500, the event processing system (e.g., the event processing system 205, etc.) can maintain content items (e.g., the content items 270) corresponding to a live event (STEP 502). For example, the event processing system can maintain one or more content items in a database (e.g., the database 225). The content items can be stored in association with corresponding content attributes, which can identify one or more properties of the content items (e.g., identifiers of content streams associated with the content items, identifiers of events associated with the content items, identifiers of event players, event teams, fantasy sports information, wager type, etc.). In some implementations, the content items can be stored in association with one or more topics, tags, or categories, and can include identifiers of a type of actionable object in the content item, if present. To maintain or store the content items, the event processing system can receive the content items, for example, from one or more external sources (not pictured) via a network (e.g., the network 210). In some implementations, the event processing system can receive an update to one or content items content stored in the database. In response to the update, the event processing system can replace the content item to be updated with an updated content item received in the update. In some implementations, external sources can transmit content in one or more content portions (e.g., images, videos, text, metadata, etc.), and the components of the event processing system can generate the content items using the content portions. In some implementations, and as described in greater detail herein, the components of the event processing system can generate instructions that present user interface elements (e.g., actionable objects) with the content items. Likewise, in some implementations, the components of the event processing system can generate one or more of the content items, and the event processing system can store the generated content items in the database.

Upon receiving content items from an external content source, the event processing system can store the received content items in the database in association with any content properties, attributes, or other information related to the content items received from the external content source. In some implementations, the event processing system can request content items relating to current, historic, or upcoming events. For example, if the event processing system detects that an upcoming live event will be broadcast to one or more broadcast receiver devices (e.g., the broadcast receiver devices 220) by a broadcast provider system (e.g., the broadcast provider system 215), the event processing system can request content items relating to the upcoming event from the one or more external sources. The received content items can then be stored in association with an identifier of the upcoming event, and can subsequently be processed by other components of the event processing system as described herein.

The event processing system can identify historic content streams accessed by the broadcast receiver device (STEP 504). For example, the event processing system can identify one or more interactions that are provided via one or more broadcast receiver devices while the one or more broadcast receiver devices present one or more broadcasts of historic content streams. As described herein, the event processing system can maintain data structures that include identifiers of content streams provided by the broadcast provider system and accessed by the broadcast receiver devices. In some implementations, to identify the historic content streams, the event processing system can access the content streams at the broadcast provider system in communication with the broadcast receiver device. In addition, the event processing system can identify one or more interactions provided by a broadcast receiver device while the broadcast receiver device presents the broadcast of the content stream. In some implementations, a player profile (e.g., the player profile 255) to which the broadcast receiver device is registered must include an "opt-in" option for the event processing system to store a record of the content streams (e.g., including broadcasts of live events, etc.) accessed by the broadcast receiver device.

In some implementations, the event processing system can query the attributes with a third party to retrieve additional information about the content streams. For example, the event processing system can query a third party to retrieve information about players, sports teams, actors, or venues associated with that the content streams. In some implementations, a content provider or classifier can access attributes of content streams, and to update the attributes of any content streams accessed by the broadcast receiver device. The event processing system can receive the updates. In some implementations, a classification model can access the attributes to update the attributes to categorize the content streams. For example, the classification model can identify that that a content stream relates to a soccer match. The classification model can update or generate the attributes relating to the content stream to indicate that the content stream 260 relates to a soccer match. In some implementations, subject matter experts (e.g., sports broadcasters) can train the classification model to identify or generate attributes of the content stream. For example, the subject matter experts can train the classification model to generate attributes relating to soccer matches upon that content streams including display of a soccer field or 22 players on the field.

In some implementations, when the broadcast receiver device transmits an identifier to the event processing system, the event processing system can identify the player profile used to access the event processing system via the broadcast receiver device. To do so, the event processing system can parse the identifier as it is received by the event processing system. Upon identifying the identifier of the player profile with which the broadcast receiver device is associated, the event processing system can use the identifier to perform a lookup operation in the database to access the information of the identified player profile. The player profile can include an option, which can be modified via messages transmitted to the event processing system to modify a player profile, which indicates whether the event processing system can store attributes of content streams accessed by the broadcast receiver device. If the player profile associated with an interaction received by the event processing system indicates that the event processing system is authorized to store attributes of content streams accessed by the broadcast receiver device, the event processing system can extract one or more attributes of the content streams that was accessed while the broadcast receiver device transmitted the interaction to the event processing system.

In some implementations, the event processing system can receive identifiers associated with the display of the content streams. If the player profile indicates that the event processing system is authorized to store identifiers of the broadcast receiver device and/or the display device, the event processing system can store the identifiers. To request and receive the identifiers, the event processing system can establish inter-process communication (IPC) with the broadcast receiver device and/or the display device. For example, the event processing system can receive identifiers that identify interactions with the content streams displayed by the broadcast receiver device. The identifiers of the interactions can include, for example, interaction coordinates, an interaction type (e.g., click, swipe, scroll, tap, etc.), and an indication of an actionable object with which the interaction occurred. The identifiers can identify the application executing on or in association with the broadcast receiver device. For example, the identifiers can identify the application executed by the smart TV to display the content streams. In some implementations, the identifiers can include other applications and activities associated therewith on the display device. For example, the smart TV can indicate the other applications being executed by the smart TV, such as sports channels or games. The event processing system can store identifiers of the other applications into the player profile.

In some implementations, the event processing system can receive a request from a client device or a broadcast receiver device to modify or authorize access to the player profile. The request to modify or authorize access to the player profile can include, for example, an identifier of the player profile to modify or access, and updated information to store as part of the player profile. In response to the request to modify the player profile, the event processing system can update the player profile with the updated information in the request, and transmit a notification to the requesting computing device that indicates the player profile was updated. In response to the request to modify or authorize access to the player profile, the event processing system can enable the option to access broadcasts of historic content streams associated with the broadcast receiver device, or store an attribute of any content streams accessed by the broadcast receiver device as part of the historic content streams, as described herein. The event processing system can identify any broadcasts of the historic content streams accessed by the broadcast receiver device(s) associated with the player profile. In some implementations, the event processing system can receive a request to authorize access to the attributes of the content streams accessed by the broadcast receiver device associated with (e.g., registered to, etc.) the player profile. In response to the request to authorize access to the attributes of the content streams, the event processing system can enable the option to access and update the player profile. In some implementations, a content provider or classifier can update the player profile with tags. The tags can relate to preferences of the player corresponding to the player profile. For example, the tags can indicate a preferred type of wagers (e.g., proposition bets) for the player profile.

The broadcast receiver device can generate or update a streaming profile associated with the player profile corresponding to the broadcast receiver device or display device (e.g., smart TV). The broadcast receiver device may also provide indications of content streams currently being displayed by the broadcast receiver device to the event processing system. The broadcast receiver device can identify any content streams accessed by the broadcast receiver device(s) associated with the player profile. The streaming profile can identify a history or pattern of access to the content streams by the broadcast receiver device. For example, the streaming profile can identify that a particular broadcast receiver device 220 receives news TV shows in the mornings and sports matches in the evenings.

The broadcast receiver device can generate the streaming profile based on the attributes of the content streams accessed by the broadcast receiver device associated with the player profile. The event processing system can associate the attributes with the streaming profile corresponding to the broadcast receiver device receiving the content streams. The stream identifier broadcast receiver device may also provide indications of content streams as they are accessed by the broadcast receiver device. The event processing system can update the streaming profile with the attributes of the content streams accessed by the broadcast receiver device.

In some implementations, the broadcast receiver device (or the application executing on the broadcast receiver device) can transmit one or more notifications or alerts with the content streams. The request can be transmitted, for example, in response to navigating to the content streams at the broadcast receiver device. For example, when a player uses an input device to select content streams provided by the broadcast provider system or external media source to display at a display device, the broadcast receiver device can transmit a request for additional content to the event processing system that identifies the displayed content streams. In some implementations, the request for additional content can include an indication of the player profile associated with the broadcast receiver device.

The event processing system can determine an arrangement based on attributes of the historic content streams (STEP 506). The event processing system can determine an arrangement of one or more content items corresponding to the one or more live events. The event processing system can determine to provide content items to the broadcast receiver devices based on similarities (e.g., tags, categories, common players, common teams, common event types, etc.) between the content items and player profiles corresponding to the broadcast receiver devices. In some implementations, the event processing system can determine to provide additional content to a broadcast receiver device upon determining that the broadcast receiver device is displaying content streams that satisfy one or more criteria (e.g., the content streams correspond to a live event associated with the content items, the content streams include broadcast content of a live event type associated with the content items, the content streams are related to one or more fantasy sports lineups associated with the content items, etc.). Some examples of showing content streams are depicted in FIGS. 3A, 3B, and 3C.

The event processing system can determine, generate, or select an arrangement of one or more content items to provide the broadcast receiver device. The arrangement determiner can determine the arrangement, for example, based on one or more attributes of the content streams that were previously accessed by the broadcast receiver device associated with a player profile. In some implementations, the event processing system can determine the arrangement based on the attributes of the content streams identified by the event processing system. In some implementations, the event processing system can determine the arrangement based on the identifiers of the applications associated with the broadcast receiver device, such as applications of content providers executing on a display device (e.g., smart TV). In some implementations, the event processing system can determine the arrangement based on the streaming profile associated with or included in the player profile. Because on the attributes provided by the broadcast receiver devices and identified by the event processing system, the event processing system can identify the types of content items (e.g., types of wagers for a soccer match) relevant to the content streams (e.g., soccer match) for receiving interactions from the broadcast receiver device (e.g., receipt of wagers for the soccer match being displayed). Therefore, in some implementations, the event processing system can select the one or more content items to provide to the broadcast receiver device based on the attributes of the identified content streams.

In some implementations, the event processing system can rank (and thereby arrange) the selected content items based on one or more attributes of a content stream currently being presented at the broadcast receiver device or the display device (e.g., smart TV) that requested the content items to display with content streams. For example, the arrangement determiner can arrange the content items to include wagers associated with a content stream based on updates, changes, or events associated with the content stream (e.g., the score changes, a player is injured or ejected, a team is added or eliminated in a tournament, etc.). As described herein, the broadcast receiver device can provide an indication of content streams being presented at a display device to the event processing system. Upon receiving the indication, the event processing system can access the additional information relating to the content streams, as described herein. Recall that the additional information can be retrieved, for example, from one or more external sources or from an internal database that maintains information and attributes of events depicted in content streams. The event processing system can then determine a match score between each selected content item and the attributes of the content streams being presented at the broadcast receiver device. The match score calculated for each of the selected content items can be the rank for that selected content item. The event processing system can then determine the arrangement for the selected content items based on the ranking, as above.

In some implementations, the event processing system can determine a match score for one or more candidate content items. The candidate content items can be selected, for example, as content items corresponding to current or upcoming live events. In some implementations, the candidate content items can be content items that are associated with (e.g., as a category or tag, etc.) a broadcast of a current or upcoming event. For example, the event processing system can rank (and thereby arrange) the selected content items (e.g., wagers) based on the content streams that were previously accessed by the broadcast receiver device. For example, when the player requests to place a wager, the wager can be recorded as an open or otherwise unresolved wager. Because wagers are often placed on uncertain events, where a player can risk a certain amount of money for an uncertain large reward, the odds of any particular outcome of a wager can change according to the conditions of the uncertain events. These odds values, or other real-time wager information, can be adjusted based on a variety of factors, including a change in a likelihood that a particular outcome will occur, or a change in an amount of credits wagered by all players participating in the wagers on any particular outcome, among others.

From the candidate content items, the event processing system can further select one or more content items to present at the broadcast receiver device, and determine an arrangement for the selected content items. In some implementations, to select the content items to present at the broadcast receiver device, the event processing system can determine a match score between the attributes of each of the candidate content items and the attributes of the historic content streams identified by the event processing system. To determine a match score, the event processing system can determine a number of common attributes (e.g., tags, categories, common players, common teams, common event types, etc.) between the content item and each historic content stream. In some implementations, wagers, notifications, alerts, and other interactive content items displayed with live broadcast content can be selected or generated by the event processing system based on the player profile. This additional content can be selected by the arrangement determiner based on various attributes of a player profile associated with a broadcast receiver device, including wager opportunities based on current in game events (e.g., elapsed time, player statistics, team statistics, game statistics, etc.), historical activity data of the player profile, or historical live events accessed or interacted with by the player profile, among others. The aggregate of the total number of matching attributes between the content item and the attributes of each historic content streams can be the match score. However, it should be understood that an aggregate is just an example, and other calculations may be performed to calculate a match score between the attributes of each content stream and the content items.

Once the match score has been calculated for each candidate content item, the event processing system can determine or select the candidate content items to present at the broadcast receiver device by selecting a predetermined number of candidate content items. If ties occur, the event processing system can select the predetermined number of content items according to a tie breaking policy (e.g., alphabetical order first wins, reverse alphabetical order first wins, any other tie breaking policy, etc.). In some implementations, the event processing system can identify each broadcast receiver device that is displaying a broadcast of a live event (e.g., currently streaming a sporting event). In some implementations, the event processing system can calculate the match score as between the attributes of each candidate content item and the attributes of the corresponding player profile of each broadcast receiver device that is displaying the broadcast of the live event. In such implementations, the match score can be calculated in a similar manner. In some implementations, the match score calculated based on the attributes of the player profile can be added to the match score calculated based on the attributes of the historic content streams identified by the event processing system to create an aggregate match score. The event processing system can then select the content items to present at the broadcast receiver device as above, but using the aggregate match score.

Once the content items have been selected from the candidate content items, the event processing system can use the attributes of the content streams to determine an arrangement for the selected content items. The arrangement of the content items can identify one or more positions in an application interface where each content item will be displayed. For example, the content items may be provided in a sorted list of content items according to a ranking. Content items having a larger ranking can be positioned higher in the list than content items with a lower ranking. In some implementations, the ranking can indicate a relative size of the content items (e.g., where content items having a higher ranking are presented at a larger size or a larger prominence, etc.). Likewise, it should be understood that other arrangements are possible, where a respective score or ranking designated to one or more of the selected content items can be used to specify the position or size of the content item when displayed at the broadcast receiver device.

The event processing system can determine an arrangement for the selected content items based on, for example, the respective player profile. For example, the event processing system can identify each broadcast receiver device displaying a broadcast of a live event or upcoming event. In some implementations, to identify the content streams accessed by the broadcast receiver device, the event processing system can identify the content streams associated with the player profile that is associated with the broadcast receiver device. If the player profile corresponding to each identified broadcast receiver device indicates a large number of interactions with a particular type of content item (e.g., winter sports, etc.) relative to other types of content items (e.g., tennis), the event processing system can rank similar content items as higher than other content items. In some implementations, the event processing system can include artificial intelligence models (e.g., machine learning models, neural network, decision trees, ruled-based lookup tables, etc.) that cause the event processing system to assign a rank to each of the content items based on their types, the attributes of the corresponding player profile and its associated interactions, and the attributes of the historic content streams.

The event processing system can train one or more artificial intelligence models that generate a corresponding rank for each of the selected content items. To do so, the event processing system can apply sets of training data labeled training data, which can include sets of content items, player profile attributes, interactions, and attributes of live events.

The training data can be labeled with ground-truth values corresponding to the ranks of the content items in the training data. In some implementations, a classification model or subject matter experts (e.g., content producers or wager regulators) can assign ranks to the content items. In some implementations, the classification model can classify the content items. For example, the classification model can identify that that content items relate to wagers for a soccer match based on texts or logos (e.g., of soccer teams) included in the content items. In some implementations, subject matter experts (e.g., sports broadcasters or wager regulators) can train the classification model to identify or classify the content items. In some implementations, the subject matter experts can rank the content items based on players, teams, actionable objects, or media content included in the content items. For example, content items with an actionable object to place a wager can be ranked higher than content items that advertise a TV show.

The event processing system can train the model using one or more supervised learning techniques, such as backpropagation. In some implementations, the event processing system can train the artificial intelligence model(s) using unsupervised learning techniques, or semi-supervised learning techniques. Once the model is trained, the event processing system can use the artificial intelligence model to generate rankings for the selected content items, based on the attributes of the corresponding player profile and its associated interactions and historic content streams.

In some implementations, the event processing system can rank (and thereby arrange) the selected content items based on one or more attributes of a broadcast currently being presented at the broadcast receiver device or the display device (e.g., smart TV) that requested the content items to display with content streams. For example, the event processing system can arrange the content items to include wagers associated with a content stream based on updates, changes, or events associated with the content stream (e.g., the score changes, a player is injured or ejected, a team is added or eliminated in a tournament, etc.).

In some implementations, the event processing system can determine the arrangement of the content items based on a known layout of content streams. Certain content streams, such as content streams of sporting events on particular television channels, often include a regular layout, with a portion of the content streams dedicated toward gameplay footage, and other portions of the content streams dedicated to score information, team information, player information, and other information. Other types of content streams have similar layout schemes. Often, in such layout schemes, some regions of the content streams are left unused, or otherwise do not include any interesting information. When the event processing system receives an indication that a broadcast receiver device is displaying content streams, the additional information retrieved relating to the content streams can include indications of regions of the content streams that are "uninteresting." In some implementations, the event processing system can determine the arrangement of the content items to fill these "unused" or "uninteresting" spaces in content streams, such that the selected content items can be presented on top of, or directly with the content streams with blocking or occluding otherwise important aspects of the content streams. To do so, the event processing system can determine positions and sizes for the selected content items such that they fill one or more portions of the content streams that are "unused." For example, in some implementations, a list of the selected content items can be displayed in a region of the display that is designated as "unused" or "uninteresting," and the selected content items can be displayed in the list according to their ranking.

The event processing system can generate instructions to display the arrangement with the live event at a broadcast receiver device (STEP 508). The event processing system can generate display instructions for the broadcast receiver device or the display device (e.g., smart TV) based on the arrangement of the selected content items. The display instructions can include, for example, instructions to display the content items as part of a notification (e.g., an alert or a popup overlaid over the broadcast of the live event displayed at the broadcast receiver device), and/or formatting instructions to position each of the content items according to the arrangement (e.g., absolute or relative positions of the content items, an order of the content items in a list, etc.). In addition, the instructions can include the selected content items and an indication that the selected content items are to be presented with a broadcast of a live event displayed at the broadcast receiver device. As described herein, the broadcast receiver devices can receive content streams from a broadcast provider system, for example, via a proprietary broadcast network. In conventional broadcast systems, broadcast receiver devices cannot display additional content according to customized arrangements or properties or attributes of the displayed content streams. The method 500 is an improvement over these conventional systems because the event processing system can generate instructions that cause an application executing on the broadcast receiver device to display selected content items according to a customized arrangement at the same time as the content streams (e.g., broadcast content). Some examples of a display showing notifications, alerts, or other content items being displayed with content streams are depicted in FIGS. 4A, 4B, and 4C.

The instructions generated by the event processing system can be received, for example, by the broadcast provider system, and can identify the broadcast receiver devices to which the display instructions are directed. The event processing system can generate display instructions, which can be formatting instructions or other types of executable or computer-readable instructions that cause the broadcast receiver device to display any of the application interfaces depicted in FIGS. 4A, 4B, and 4C, among other display features described herein. The display instructions can include the content items, and one or more scripts that cause the content items to be or to include actionable objects, as described herein. In some implementations, to generate the display instructions, the event processing system can utilize one or more templates corresponding to a type of content item (e.g., a content item that causes the broadcast receiver device to place a wager on a live event, a content item that causes the broadcast receiver device to navigate to another broadcast, a content item that causes the broadcast receiver device to create or modify a fantasy sports lineup, etc.). To generate the instructions, the instructions generator can populate predetermined portions of the template with one or more of the selected content items. In some implementations, the event processing system can generate the instructions based on a determined type of broadcast receiver device. For example, a cable box may require a different type of instructions than a set top box, or a cable box that receives a satellite signal via a satellite dish. To accommodate for different types of broadcast receiver devices, the event processing system can maintain sets of templates both for each content item type (e.g., types of interactions, types of content items or media content, etc.) and for each type of broadcast receiver device.

The event processing system can transmit the instructions to display the arrangement of content items with the live event at the broadcast receiver device (STEP 510). Once generated, the event processing system can transmit the display instructions to the broadcast receiver device, causing the broadcast receiver device to display the content items according to the arrangement with the broadcast of the live event, similar to the displays in FIG. 4A, 4B, or 4C. In some implementations, the event processing system can transmit the display instructions to the broadcast provider system. In some implementations, the event processing system can transmit the display instructions to the broadcast receiver device or a display device associated with or coupled to the broadcast receiver device. The instructions can include, for example, indications of the one or more broadcast receiver devices that are to receive the display instructions. Upon receiving the display instructions from the event processing system, the broadcast provider system can identify the one or more destination receiver devices as indicated in the instructions, and transmit the display instructions to each of the destination broadcast receiver devices. The application executing on the broadcast receiver device can receive the display instructions and identify the arrangement of the content items to display in the live event. The application can then render the content items in one or more application interfaces or overlays, such as those depicted in FIG. 4A, 4B, or 4C. As described herein, the broadcast receiver device can receive interactions from a player via one or more input devices, allowing for interaction with one or more actionable objects depicted as part of the content items. Upon detecting an interaction, the broadcast receiver device can parse or execute the display instructions for the selected content items to carry out the designated action (e.g., transmit a request to place a wager, navigate to other content streams, navigate to a broadcast of another live event that is associated with the displayed content items, update a fantasy sports lineup, etc.). It should be understood that any other functionality as described herein could be carried out by the broadcast receiver device using the broadcast application or by executing the generated display instructions.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on a computer storage medium for execution by, or to control the operation of, a data processing apparatus. The program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "event processing system," "client device," "computing platform," "computing device," or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementations of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the event processing system 205 can include clients and servers. For example, the event processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementations details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementations can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the event processing system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementations are not intended to be excluded from a similar role in other implementations or implementation.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementations, the systems and methods described herein consist of one, each combination of more than one, or all of the described elements, acts, or components.

Any references to implementations or elements or acts of the systems and methods herein referred to in the singular may also embrace implementations including one or more of these elements, and any references in plural to any implementations or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementations disclosed herein may be combined with any other implementations, and references to "an implementation," "some implementation," "an alternate implementation," "various implementation," "one implementation" or the like are not necessarily mutually exclusive and are intended to indicate that a particular feature, structure, or characteristic described in connection with the implementations may be included in at least one implementation. Such terms as used herein are not necessarily all referring to the same implementation. Any implementations may be combined with any other implementations, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absences have any limiting effect on the scope of any claim elements.

The systems and methods described herein may be embodied in other specific forms without departing from the characteristics thereof. Although the examples provided may be useful for generating notification interfaces based on media broadcast access events, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
    maintaining, by one or more processors coupled to memory, a streaming profile for an entity associated with a broadcast receiver device, the streaming profile generated based on a respective access frequency and one or more respective attributes of each historic content stream of a plurality of historic content streams accessed by the broadcast receiver device during a historic time period;
    selecting and ranking, by the one or more processors, based at least on the respective access frequency and the one or more respective attributes of the plurality of historic content streams indicated in the streaming profile, a plurality of wager opportunities each identifying a respective live event currently being broadcast;
    responsive to selecting and ranking the plurality of wager opportunities:
        generating, by the one or more processors, display instructions for the broadcast receiver device that cause the broadcast receiver device to display a plurality of content items according to the ranking with a broadcast of a live event currently presented by the broadcast receiver device, each content item of the plurality of content items corresponding to a respective wager opportunity of the plurality of wager opportunities, each content item of the plurality of content items including a respective actionable object that causes the broadcast receiver device to navigate to a respective broadcast of the respective live event identified by the respective wager opportunity and a second actionable object that causes the broadcast receiver device to transmit a request to place a wager for the respective wager opportunity; and
        transmitting, by the one or processors, the display instructions to the broadcast receiver device to cause the broadcast receiver device to display the plurality of content items with the broadcast of the live event.

2. The method of claim 1, further comprising identifying, by the one or more processors, the broadcast receiver device based on a signal received from the broadcast receiver device that indicates the broadcast receiver device is displaying the broadcast of the live event.

3. The method of claim 1, further comprising selecting and ranking, by the one or more processors, the plurality of wager opportunities based on occurrences within each respective live event.

4. The method of claim 1, wherein maintaining the streaming profile comprises identifying, by the one or more processors, the plurality of historic content streams from a player profile associated with the entity.

5. The method of claim 1, wherein generating the display instructions is further based on one or more attributes of the live event displayed via the broadcast receiver device.

6. The method of claim 1, further comprising:
    receiving, by the one or more processors, a request to authorize identification of content streams accessed by the broadcast receiver device; and
    identifying, by the one or more processors, the plurality of historic content streams accessed by the broadcast receiver device responsive to the request.

7. The method of claim 6, wherein identifying the plurality of historic content streams further comprises identifying, by the one or more processors, the plurality of historic content streams via a broadcast provider system in communication with the broadcast receiver device.

8. The method of claim 1, wherein generating the display instructions for the broadcast receiver device is responsive to an occurrence during the first live event.

9. The method of claim 8, wherein the occurrence during the first live event comprises at least one of a score change, a player being injured or ejected, or a change in odds values associated with the first live event.

10. A system, comprising:
    one or more processors coupled to memory, the one or more processors configured to:
        maintain a streaming profile for an entity associated with a broadcast receiver device, the streaming profile generated based on a respective access frequency and one or more respective attributes of each historic content stream of a plurality of historic content streams accessed by the broadcast receiver device during a historic time period;

select and rank, based at least on the respective access frequency and the one or more respective attributes of the plurality of historic content streams indicated in the streaming profile, a plurality of wager opportunities each identifying a respective live event currently being broadcast;

responsive to selecting and ranking the plurality of wager opportunities:

generate display instructions for the broadcast receiver device that cause the broadcast receiver device to display a plurality of content items according to the ranking with a broadcast of a live event currently presented by the broadcast receiver device, each content item of the plurality of content items corresponding to a respective wager opportunity of the plurality of wager opportunities, each content item of the plurality of content items including a respective actionable object that causes the broadcast receiver device to navigate to a respective broadcast of the respective live event identified by the respective wager opportunity and a second actionable object that causes the broadcast receiver device to transmit a request to place a wager for the respective wager opportunity; and transmit the display instructions to the broadcast receiver device to cause the broadcast receiver device to display the plurality of content items with the broadcast of the live event.

11. The system of claim 10, wherein the one or more processors are further configured to identify the broadcast receiver device based on a signal received from the broadcast receiver device that indicates the broadcast receiver device is displaying the broadcast of the live event.

12. The system of claim 10, wherein the one or more processors are further configured to select and rank the plurality of wager opportunities based on occurrences within each respective live event.

13. The system of claim 10, wherein to maintain the streaming profile, the one or more processors are further configured to identify the plurality of historic content streams from a player profile associated with the entity.

14. The system of claim 10, wherein the one or more processors are further configured to generate the display instructions further based on one or more attributes of the live event displayed via the broadcast receiver device.

15. The system of claim 10, wherein the one or more processors are further configured to:

receive a request to authorize identification of content streams accessed by the broadcast receiver device; and identify the plurality of historic content streams accessed by the broadcast receiver device responsive to the request.

16. The system of claim 15, wherein to identify the plurality of historic content streams, the one or more processors are further configured to identify the plurality of historic content streams via a broadcast provider system in communication with the broadcast receiver device.

17. The system of claim 10, wherein the one or more processors are further configured to generate the display instructions for the broadcast receiver device is responsive to an occurrence during the live event.

18. The system of claim 17, wherein the occurrence during the live event comprises at least one of a score change, a player being injured or ejected, or a change in odds values associated with the live event.

* * * * *